United States Patent
Luo et al.

(10) Patent No.: US 11,921,715 B2
(45) Date of Patent: Mar. 5, 2024

(54) SEARCH INTEGRATION

(71) Applicant: MicroStrategy Incorporated, Vienna, VA (US)

(72) Inventors: Yi Luo, Herndon, VA (US); Rachel Hylton Landers, San Francisco, CA (US); Ananya Ojha, Dunn Loring, VA (US); Zhili Cheng, Dunn Loring, VA (US); Dongping Liang, Herndon, VA (US)

(73) Assignee: MicroStrategy Incorporated, Vienna, VA (US)

( * ) Notice: Subject to any disclaimer, the term of this patent is extended or adjusted under 35 U.S.C. 154(b) by 199 days.

(21) Appl. No.: 16/566,339

(22) Filed: Sep. 10, 2019

(65) Prior Publication Data

US 2020/0012638 A1    Jan. 9, 2020

Related U.S. Application Data

(63) Continuation-in-part of application No. 16/368,282, filed on Mar. 28, 2019, now Pat. No. 11,822,545, which is a continuation of application No. 14/606,178, filed on Jan. 27, 2015, now Pat. No. 10,255,320.

(60) Provisional application No. 62/021,625, filed on Jul. 7, 2014, provisional application No. 61/931,970, filed on Jan. 27, 2014.

(51) Int. Cl.
*G06F 16/24* (2019.01)
*G06F 16/245* (2019.01)

(52) U.S. Cl.
CPC ................. *G06F 16/245* (2019.01)

(58) Field of Classification Search
CPC .... G06F 16/248; G06F 16/252; G06F 16/211; G06F 16/24575; G06F 16/287
See application file for complete search history.

(56) References Cited

U.S. PATENT DOCUMENTS

| | | | |
|---|---|---|---|
| 4,769,772 | A | 9/1988 | Dwyer |
| 5,414,469 | A | 5/1995 | Gonzales et al. |
| 5,590,319 | A | 12/1996 | Cohen et al. |
| 6,442,522 | B1 | 8/2002 | Carberry et al. |

(Continued)

OTHER PUBLICATIONS archives.microstratey.com [online], "What's New in MicroStrategy 11.0," retrieved on Feb. 13, 2020, retrieved from URL <https://doc-archives.microstrategy.com/producthelp/11.0/Readme/content/whats_new.htm>, 2019, 8 pages.

(Continued)

*Primary Examiner* — Etienne P Leroux
*Assistant Examiner* — Cindy Nguyen
(74) *Attorney, Agent, or Firm* — Fish & Richardson P.C.

(57) ABSTRACT

Search integration is described. The actions include receiving, by one or more processors, a query. The actions include identifying search results that are responsive to the query. The actions include identifying, based on the query and the search results, structured data to supplement the search results, wherein the structured data is generated from binary table data that is received and deserialized by one or more processing modules. The actions include processing the structured data and the search results. The actions include providing, for output, the processed search results and the processed structured data results.

19 Claims, 20 Drawing Sheets

(56) References Cited

U.S. PATENT DOCUMENTS

| | | |
|---|---|---|
| 6,701,294 B1 | 3/2004 | Ball et al. |
| 7,181,444 B2 | 2/2007 | Porter et al. |
| 7,356,840 B1 | 4/2008 | Bedell et al. |
| 7,827,125 B1 | 11/2010 | Rennison |
| 8,024,666 B2 | 9/2011 | Thompson |
| 8,103,608 B2 | 1/2012 | Green et al. |
| 8,296,475 B2 | 10/2012 | Kottomtharayil |
| 8,402,052 B2 | 3/2013 | Sano et al. |
| 8,495,627 B2 | 7/2013 | Barsness et al. |
| 8,695,009 B2 | 4/2014 | Vojnovic et al. |
| 8,825,720 B1 | 9/2014 | Xie et al. |
| 8,886,631 B2 | 11/2014 | Abadi et al. |
| 8,924,978 B2 | 12/2014 | Meng et al. |
| 8,996,523 B1 | 3/2015 | Fisher |
| 9,092,266 B2 | 7/2015 | Boutin et al. |
| 9,128,763 B2 | 9/2015 | Sarkar et al. |
| 9,129,448 B2 | 9/2015 | Bekmambetov et al. |
| 9,141,611 B2 | 9/2015 | Crook |
| 9,183,540 B2 | 10/2015 | Eberlein et al. |
| 9,189,515 B1 | 11/2015 | Tamilmani et al. |
| 9,229,950 B2 | 1/2016 | Chen et al. |
| 9,411,853 B1 | 8/2016 | Dovrtel et al. |
| 9,411,861 B2 | 8/2016 | Bestgen et al. |
| 9,456,049 B2 | 9/2016 | Soundararajan et al. |
| 9,514,220 B1 | 12/2016 | Wright |
| 9,665,662 B1* | 5/2017 | Gautam ............... G06F 16/903 |
| 9,672,122 B1 | 6/2017 | Gandhi et al. |
| 10,073,882 B1 | 9/2018 | Gupta et al. |
| 10,095,759 B1 | 10/2018 | Cappiello |
| 10,108,676 B2 | 10/2018 | Li |
| 10,223,376 B2 | 3/2019 | Lee et al. |
| 10,255,320 B1 | 4/2019 | Cappiello |
| 10,296,617 B1 | 5/2019 | Zhang et al. |
| 10,303,557 B2 | 5/2019 | Pradban et al. |
| 10,635,669 B1 | 4/2020 | Cappiello |
| 10,740,005 B1 | 8/2020 | Ives et al. |
| 10,877,669 B1 | 12/2020 | Sivasubramanian et al. |
| 11,386,085 B2 | 7/2022 | Luo et al. |
| 11,625,415 B2 | 4/2023 | Cappiello |
| 2002/0032676 A1 | 3/2002 | Reiner et al. |
| 2003/0233403 A1 | 12/2003 | Bae et al. |
| 2004/0019678 A1 | 1/2004 | St. Pierre et al. |
| 2004/0165780 A1 | 8/2004 | Maki et al. |
| 2005/0050036 A1 | 3/2005 | Araki |
| 2005/0091283 A1 | 4/2005 | Debique et al. |
| 2005/0102371 A1 | 5/2005 | Aksu |
| 2005/0187977 A1 | 8/2005 | Frost |
| 2005/0203878 A1 | 9/2005 | Brill et al. |
| 2006/0004674 A1 | 1/2006 | Tesser |
| 2006/0053171 A1 | 3/2006 | Eldridge et al. |
| 2006/0155687 A1 | 7/2006 | Chou |
| 2006/0155688 A1 | 7/2006 | Chou |
| 2006/0227970 A1 | 10/2006 | Nakano |
| 2007/0112754 A1 | 5/2007 | Haigh et al. |
| 2007/0130131 A1 | 6/2007 | Porter et al. |
| 2007/0208690 A1 | 9/2007 | Schneider et al. |
| 2007/0245383 A1 | 10/2007 | Bhide et al. |
| 2008/0005677 A1 | 1/2008 | Thompson |
| 2008/0033915 A1 | 2/2008 | Chen et al. |
| 2008/0033925 A1 | 2/2008 | Richards et al. |
| 2008/0155197 A1 | 6/2008 | Li et al. |
| 2008/0172362 A1 | 7/2008 | Shacham |
| 2008/0189655 A1* | 8/2008 | Kol ....................... G06Q 10/10 715/808 |
| 2008/0201304 A1 | 8/2008 | Sue |
| 2008/0250021 A1 | 10/2008 | Boys et al. |
| 2009/0104123 A1 | 4/2009 | Yang et al. |
| 2009/0112949 A1 | 4/2009 | Ergan et al. |
| 2009/0164412 A1 | 6/2009 | Bestgen et al. |
| 2009/0287673 A1 | 11/2009 | Chronister et al. |
| 2009/0327883 A1 | 12/2009 | Robertson et al. |
| 2010/0131254 A1 | 5/2010 | Rubin et al. |
| 2011/0040733 A1 | 2/2011 | Sercinoglu et al. |
| 2011/0047144 A1 | 2/2011 | Han et al. |
| 2011/0137850 A1 | 6/2011 | Mourey et al. |
| 2011/0225288 A1 | 9/2011 | Easterday et al. |
| 2011/0264657 A1 | 10/2011 | Hoffman et al. |
| 2011/0302583 A1 | 12/2011 | Abadi et al. |
| 2011/0314057 A1 | 12/2011 | Banfer |
| 2012/0016678 A1 | 1/2012 | Gruber et al. |
| 2012/0023101 A1 | 1/2012 | Heimendinger et al. |
| 2012/0084296 A1 | 4/2012 | Waters |
| 2012/0089629 A1 | 4/2012 | Koll et al. |
| 2012/0095984 A1* | 4/2012 | Wren-Hilton ......... G06F 16/903 707/707 |
| 2012/0102053 A1 | 4/2012 | Barrett et al. |
| 2012/0136649 A1 | 5/2012 | Freising et al. |
| 2012/0179714 A1 | 7/2012 | Chandhok et al. |
| 2012/0226804 A1 | 9/2012 | Raja et al. |
| 2012/0233191 A1 | 9/2012 | Ramanujam |
| 2013/0013552 A1 | 1/2013 | Eshleman et al. |
| 2013/0013883 A1 | 1/2013 | Kottomtharayil et al. |
| 2013/0018903 A1 | 1/2013 | Taranov |
| 2013/0086107 A1 | 4/2013 | Genochio et al. |
| 2013/0097177 A1 | 4/2013 | Fan et al. |
| 2013/0132967 A1 | 5/2013 | Soundararajan et al. |
| 2013/0166547 A1 | 6/2013 | Pasumarthi et al. |
| 2013/0166573 A1* | 6/2013 | Vaitheeswaran ...... G06F 16/242 707/749 |
| 2013/0191418 A1 | 7/2013 | Martin, Jr. et al. |
| 2013/0241926 A1 | 9/2013 | Asaria et al. |
| 2013/0254155 A1 | 9/2013 | Thollot et al. |
| 2013/0275360 A1 | 10/2013 | Kharod et al. |
| 2014/0025626 A1 | 1/2014 | Mefford et al. |
| 2014/0040306 A1 | 2/2014 | Peregrine et al. |
| 2014/0095480 A1 | 4/2014 | Marantz et al. |
| 2014/0101139 A1 | 4/2014 | van Gemert et al. |
| 2014/0149446 A1 | 5/2014 | Kuchmann-Beauger et al. |
| 2014/0149839 A1 | 5/2014 | Bedard et al. |
| 2014/0181154 A1 | 6/2014 | Amulu et al. |
| 2014/0195558 A1 | 7/2014 | Murthy et al. |
| 2014/0280032 A1 | 9/2014 | Kornacker et al. |
| 2014/0280193 A1 | 9/2014 | Cronin et al. |
| 2014/0280372 A1 | 9/2014 | Huras et al. |
| 2014/0310712 A1 | 10/2014 | Meng et al. |
| 2014/0358845 A1 | 12/2014 | Mundlapudi et al. |
| 2014/0358940 A1 | 12/2014 | Gupta et al. |
| 2014/0365429 A1 | 12/2014 | Wagner et al. |
| 2014/0372427 A1 | 12/2014 | Lehmann et al. |
| 2015/0006518 A1 | 1/2015 | Baumgartner et al. |
| 2015/0073871 A1 | 3/2015 | Hu et al. |
| 2015/0135255 A1 | 5/2015 | Theimer et al. |
| 2015/0169688 A1 | 6/2015 | Halverson et al. |
| 2015/0178052 A1 | 6/2015 | Gupta et al. |
| 2015/0193719 A1 | 7/2015 | Than et al. |
| 2015/0212663 A1* | 7/2015 | Papale ................. G06F 16/248 715/762 |
| 2015/0242410 A1* | 8/2015 | Pattabhiraman ....... G06Q 10/06 707/728 |
| 2015/0242856 A1 | 8/2015 | Dhurandhar et al. |
| 2015/0248501 A1 | 9/2015 | Kamel et al. |
| 2015/0317362 A1 | 11/2015 | Teranishi |
| 2015/0347450 A1 | 12/2015 | Phelan et al. |
| 2015/0355989 A1 | 12/2015 | Hayden et al. |
| 2016/0019215 A1 | 1/2016 | Murphey et al. |
| 2016/0048584 A1 | 2/2016 | Valentin |
| 2016/0105328 A1 | 4/2016 | Cooper et al. |
| 2016/0154852 A1 | 6/2016 | Chen et al. |
| 2016/0179922 A1 | 6/2016 | Crupi et al. |
| 2016/0239487 A1 | 8/2016 | Potharaju et al. |
| 2017/0039209 A1 | 2/2017 | Gupta et al. |
| 2017/0039281 A1 | 2/2017 | Venkata et al. |
| 2017/0220633 A1 | 8/2017 | Porath et al. |
| 2017/0270209 A1 | 9/2017 | Mueller et al. |
| 2018/0032574 A1 | 2/2018 | Vandenberg |
| 2018/0081798 A1 | 3/2018 | Alcantara et al. |
| 2018/0157738 A1 | 6/2018 | Johnson |
| 2018/0182398 A1 | 6/2018 | Halstvedt et al. |
| 2018/0308149 A1 | 10/2018 | Guo et al. |
| 2019/0121802 A1 | 4/2019 | Venkataraman et al. |
| 2019/0310977 A1 | 10/2019 | Pal et al. |
| 2019/0384759 A1 | 12/2019 | Cappiello et al. |
| 2020/0019546 A1 | 1/2020 | Luo et al. |
| 2020/0250191 A1 | 8/2020 | Cappiello |

(56) References Cited

U.S. PATENT DOCUMENTS

| | | | |
|---|---|---|---|
| 2021/0157813 A1 | 5/2021 | Hammad et al. | |
| 2021/0173714 A1 | 6/2021 | Huang et al. | |
| 2022/0284014 A1 | 9/2022 | Luo et al. | |

OTHER PUBLICATIONS archives.microstratey.com [online], "How to Use Natural Language Queries" retrieved on Feb. 13. 2020, retrieved from URL. <https://doc-archives.microstrategy.com/producthelp/11.0/Workstation/WebHelp/Lang_1033/Content/nlq.htm>, 2019, 2 pages.
Cheng, "Conversing with Your Data Using Natural Language to Boost Self-Service Analytics" MicroStrategy, Jan. 2019, 31 pages.
community.microstrategy.com [online], "KB442148: Natural Language Query in A Nutshell in MicroStrategy Web," retrieved on Feb. 13, 2020, retrieved from URL <https://community.microstrategy.com/s/article/Natural-Language-Query-in-A-Nutshell-MicroStrategy-11-0?language=en_US>, Nov. 26, 2019, 14 pages.
community.microstrategy.com [online], "Natural Language Homepage", retrieved on May 26, 2020, retrieved from URL <https://community.microstrategy.com/s/article/Natural-Language-Homepage?language-en_US>, Apr. 2017, 5 pages.
juvo.be [online], "Gartner Magic Quadrant for Business Intelligence and Analytics Platforms" retrieved May 26, 2020, retrieved from URL <https://www.juvo.be/blog/gartner-magic-quadrant-business-intelligence-and-analytics-platforms>, Feb. 2013, 53 pages.
microstrategy.com [online], "How to Use Natural Language Queries," retrieved on May 26, 2020, retrieved from URL <https://www2.microstrategy.com/producthelp/current/MSTRWeb/WebHelp/Lang_1033/Content/nlq.htm>, Sep. 2018, 2 pages.
microstratey.com [online], "What's new in MicroStrategy 11.0", retrieved on Feb. 13, 2020 retrieved from URL <https://www.microstrategy.com/getmedia/93eb0bcc-Saa3-4100-a39d-3f53eb1f73dd/microstrategy-release-notes_11-0>, 2018, 34 pages.
mindmajix.com [online], "MicroStrategy Latest Version (11.0)—New Features," retrieved on May 26, 2020, retrieved from URL. <https://mindmajix.com/microstrategy-11-0-version-new-features>, Jan. 2019, 18 pages.
searchbusinessanalytics.techtarget.com [online], "4 ways natural language querying in BI tools can benefit users," retrieved on May 26, 2020, retrieved from URL <https://searchbusinessanalytics.techtarget.com/feature/4-ways-natural-language-querying-in-BI-tools-can-benefit-users>, Dec. 2018, 5 pages.
smartbridge.com [online], "What you need to know about the new and improved MicroStrategy Dossier," retrieved on May 26, 2020, retrieved from URL <https://smartbridge.com/what-you-need-to-know-about-the-new-and-improved-microstrategy-dossier/>, Jul. 2019, 8 pages.
U.S. Office Action in U.S. Appl. No. 15/955,541, dated Oct. 8, 2019, 10 pages.
U.S. Office Action in U.S. Appl. No. 16/368,282, dated Jun. 10, 2021, 16 pages.
[No Author Listed], "Deploy Enterprise Analytics Applications Using the Native Hadoop Gateway," Powerpoint, Dec. 13, 2017, 41 pages.
Borthakur, "HDFS Architecture Guide," The Apache Software Foundation, 2006, 13 pages.
community.microstrategy.com [online], "Articles KB275774: How to connect the MicroStrategy Enterprise Platform 10.x to Apache Spark SQL," May 11, 2017, retrieved on Mar. 23, 2020, retrieved from URL <https://community.microstrategy.com/s/article/KB275774-How-to-connect-the-MicroStrategy-Enterprise-Platform-10?language=en_US>, 5 pages.
community.microstrategy.com [online], "Connecting to Hadoop with MicroStrategy," Jun. 7, 2017, retrieved on Mar. 23, 2020, retrieved from URL <https://community.microstrategy.com/s/article/Connecting-to-Hadoop-with-MicroStrategy?language=en_US>, 3 pages.
community.microstrategy.com [online], "KB248914: Overview and installation of the MicroStrategy 10.0-10.5 Secure Enterprise Platform Hadoop Gateway (Big Data Engine)," May 30, 2017. retrieved on Mar. 23, 2020, retrieved from URL <https://community.microstrategy.com/s/article/KB248914-Overview-and-installation-of-the-MicroStrategy-10?language=en_US>, 6 pages.
doc-archives.microstrategy.com [online], "Analyzing Big Data in MicroStrategy," Oct. 7, 2016, retrieved on Mar. 23, 2020, retrieved from URL <https://doc-archives.microstrategy.com/producthelp/10.7/WebUser/WebHelp/Lang_1033/Content/mstr_big_data.htm>, 21 pages.
doc-archives.microstrategy.com [online], "Introduction to the MicroStrategy Hadoop Gateway," 2019, retrieved on Mar. 23, 2020, retrieved from URL <https://doc-archives.microstrategy.com/producthelp/10.11/InstallConfig/WebHelp/Lang_1033/Content/hadoop_gateway_intro.htm>, 2 pages.
Eltabakh, "Hadoop: A Framework for DataIntensive Distributed Computing", Powerpoint presentation at Worcester Polytechnic Institute, Spring 2012, 28 pages.
en.wikipedia.org [online], "Apache Hadoop," Mar. 2019, retrieved on Mar. 23, 2020, retrieved from URL <https://en.wikipedia.org/wiki/Apache_Hadoop>, 12 pages.
en.wikipedia.org [online], "Apache Spark," May 2019, retrieved on Mar. 23, 2020, retrieved from URL <https://en.wikipedia.org/wiki/Apache_Spark>, 8 pages.
en.wikipedia.org [online], "Scala (programming language)" Jan. 2019, retrieved on Mar. 23, 2020, retrieved from URL <https://en.wikipedia.org/wiki/Scala_(programming_language)>, 29 pages.
Maru et al., "Tapping Into Hadoop and NoSQL Data Sources with MicroStrategy," Powerpoint Presentation at MicroStrategy World 2014, 2014, 38 pages.
ProPublica [online], "Chapter 1. Using Google Refine to Clean Messy Data," Nguyen, Dec. 30, 2010, [retrieved on Sep. 2, 2015], Retrieved from the Internet: URL<https://www.propublica.org/nerds/item/using-google-refine-for-data-cleaning>, 10 pages.
Shvachko et al., "The Hadoop Distributed File System," IEEE, 2010, 10 pages.
towardsdatascicence.com [online], "Big Data From B to A: The Hadoop Distributed Filesystem—HDFS," Nov. 25, 2019, retrieved on Mar. 23, 2020, retrieved from URL <https://towardsdatascience.com/big-data-from-b-to-a-the-hadoop-distributed-filesystem-hdfs-992612cbf8aa>, 6 pages.
U.S. Office Action in United States U.S. Appl. No. 16/368,282, dated Nov. 9, 2021, 13 pages.
U.S. Office Action in U.S. Appl. No. 16/705,630, dated Dec. 24, 2021, 15 pages.
U.S. Office Action in U.S. Appl. No. 16/853,629, dated Dec. 8, 2021, 15 pages.
U.S. Office Action in U.S. Appl. No. 17/102,996, dated Oct. 20, 2021, 57 pages.
Wikipedia [online], "OpenRefine," last updated Jul. 15, 2015, [retrieved on Sep. 2, 2015], Retrieved from the Internet: URL<https://en.wikipedia.org/wiki/OpenRefine>, 4 pages.
www.ibm.com [online], "HDFS Scale an Apache Hadoop cluster to hundreds of nodes with the Hadoop Distributed File System (HDFS)" May 28, 2019, retrieved on Mar. 24, 2020, retrieved from URL <https://www.ibm.com/analytics/badoop/hdfs>, 5 pages.
www.microstrategy.com [online], "What's new in MicroStrategy 10.11" Apr. 10, 2018, retrieved on Mar. 23, 2020, retrieved from URL <https://www.microstrategy.com/getmedia/5466690f-f81a-4cf4-8f16-e0d1fa220690/MicroStrategy-release-notes_10-11>, 36 pages.
www.theta.co.nz [online], "MicroStrategy version 10 enables big data engine support," Nov. 18, 2015, retrieved on Mar. 23, 2020, retrieved from URL <https://www.theta.co.nz/news-blogs/tech-blog/microstrategy-version-10-enables-big-data-engine-support/>, 3 pages.
www2.microstrategy.com [online], "Installing MicroStrategy Hadoop Gateway", 2017, retrieved on Mar. 23, 2020, retrieved from URL <https://www2.microstrategy.com/producthelp/10.4/InstallConfig/Content/InstallationConfig/installing_microstrategy_hadoop_gateway.htm>, 8 pages.
U.S. Office Action in U.S. Appl. No. 16/579,392, dated Sep. 15, 2021, 16 pages.
Notice of Allowance in U.S. Appl. No. 16/853,629, dated Apr. 25, 2022, 9 pages.

(56) References Cited

OTHER PUBLICATIONS

Office Action in U.S. Appl. No. 16/368,282, dated Mar. 2, 2022, 16 pages.
Office Action in U.S. Appl. No. 16/579,392, dated Jan. 7, 2022, 8 pages.
Office Action in U.S. Appl. No. 17/102,996, dated Mar. 24, 2022, 50 pages.
Office Action in U.S. Appl. No. 17/102,996, dated Aug. 12, 2022, 35 pages.
Office Action in U.S. Appl. No. 16/368,282, dated Aug. 5, 2022, 20 pages.
Office Action in U.S. Appl. No. 16/705,630, dated May 11, 2022, 17 pages.
Notice of Allowance in U.S. Appl. No. 16/705,630, dated Oct. 27, 2022, 11 pages.
Notice of Allowance in U.S. Appl. No. 16/368,282, dated Aug. 3, 2023, 10 pages.
Office Action in U.S. Appl. No. 16/368,282, dated Mar. 31, 2023, 22 pages.
Office Action in U.S. Appl. No. 17/102,996, dated Mar. 20, 2023, 40 pages.
Office Action in U.S. Appl. No. 17/825,000, dated Aug. 17, 2023, 28 pages.

\* cited by examiner

SEARCH INTEGRATION

CROSS REFERENCE TO RELATED APPLICATIONS

This application is a continuation-in-part of U.S. application Ser. No. 16/368,282, filed Mar. 28, 2019, which is a continuation of U.S. application Ser. No. 14/606,178, filed Jan. 27, 2015, which claims the benefit of U.S. Application No. 61/931,970, filed Jan. 27, 2014 and U.S. Application No. 62/021,625, filed Jul. 7, 2014, the contents of all of these prior applications are incorporated by reference.

FIELD

This description relates to search engine integration.

BACKGROUND

Computer systems are used to manage and store data in a structure known as a database. As such, computers can be used to analyze data and generate reports based on the analysis results. For instance, computer systems can filter data and calculate metric values based on the filtered data, ultimately providing a report including the calculated metric values. A database is an organized repository of data. There are various ways in which the data can be organized. Schemas are used to describe the different organizations of data.

Computers systems have two types of physical data storage-disk (e.g., hard drive) storage and Random Access Memory (RAM) storage. Typically, computer systems have more disk storage than RAM, but it can often take longer (e.g., in the range of 100-1,000 times longer) to read data from the disk than from RAM. This can result in noticeable performance degradation.

SUMMARY

In some implementations, a computer system provides a natural language interface to receive queries from users. The system can customize the processing of a received query based on the context in which the query is entered. For example, before a user submits a query using a device, the system can obtain contextual information about a content being accessed by the device (e.g., a document, a dashboard, a visualization, an application, or other content). The system can also obtain, as contextual information, data from data sets that are referenced by or relied on by the accessed content. The system can extract terms and phrases from accessed content as well as from underlying data sets to generate a wordbase that indicates natural language usage for the current context. When the user submits a query, the system can use the wordbase to perform various query processing operations, such as interpreting the query, generating structured queries, generating query autocompletions, selecting results for the query, ranking results for the query, and generating recommended queries.

The search functionality can tailor search parameters for a specific active document that is open. For example, the system can use the wordbase to customize the search process for an active document being viewed or created at the time a query is submitted. These techniques can also extend the search capabilities when processing a search associated with a document to encompass related data sources or data sets used to create elements of the document, e.g., a visualization or table in the document. This aspect can enable the system to use object and field names, as well as labels for columns, tables, and other portions of data sets, to better interpret the meaning of query terms. For example, matches between query terms and labels for portions of the relevant data set can indicate which portions of the data set should be returned in response to the query. The wordbase can be a dynamically updated data set representing terms relevant to the current context of a computing device. As the context changes or data in data sets change, the wordbase can be updated as well, so the wordbase is maintained as an accurate, up-to-date representation of the context relevant to the search.

In general, one innovative aspect of the subject matter described in this specification can be embodied in methods that include the actions of receiving, by one or more processors, a query; identifying search results that are responsive to the query; identifying, based on the query and the search results, structured data to supplement the search results, where the structured data is generated from binary table data that is received and deserialized by one or more processing modules; processing the structured data and the search results; and providing, for output, the processed search results and the processed structured data results.

These and other embodiments can each optionally include one or more of the following features. The one or more processing modules includes a listening module, a receiving module, a decompress module, or a deserialize module. The query is a natural language query. The query is received through a dashboard application. The action of processing the structured data and the search results includes performing analytics, filtering, aggregation, wrangling, searching, data mining, text analytics, on demand loading, incremental refreshing, streaming, data blending, complex ETL workflows, or multi-sourcing. The action of providing, for output, the processed search results and the processed structured data results includes providing, for output and to an in-memory engine, the processed search results and the processed structured data results. The action of processing the structured data and the search results includes identifying a portion of the processing to be performed by an in-memory engine; and providing, to the in-memory engine, the search results and the structured data results. The action of identifying search results that are responsive to the query includes identifying, using a search index, search results that are responsive to the query. The structured data includes a global queue generated from the binary table data that is received and deserialized by the one or more processing modules.

Other embodiments of this aspect include corresponding systems, apparatus, and computer programs recorded on computer storage devices, each configured to perform the operations of the methods.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
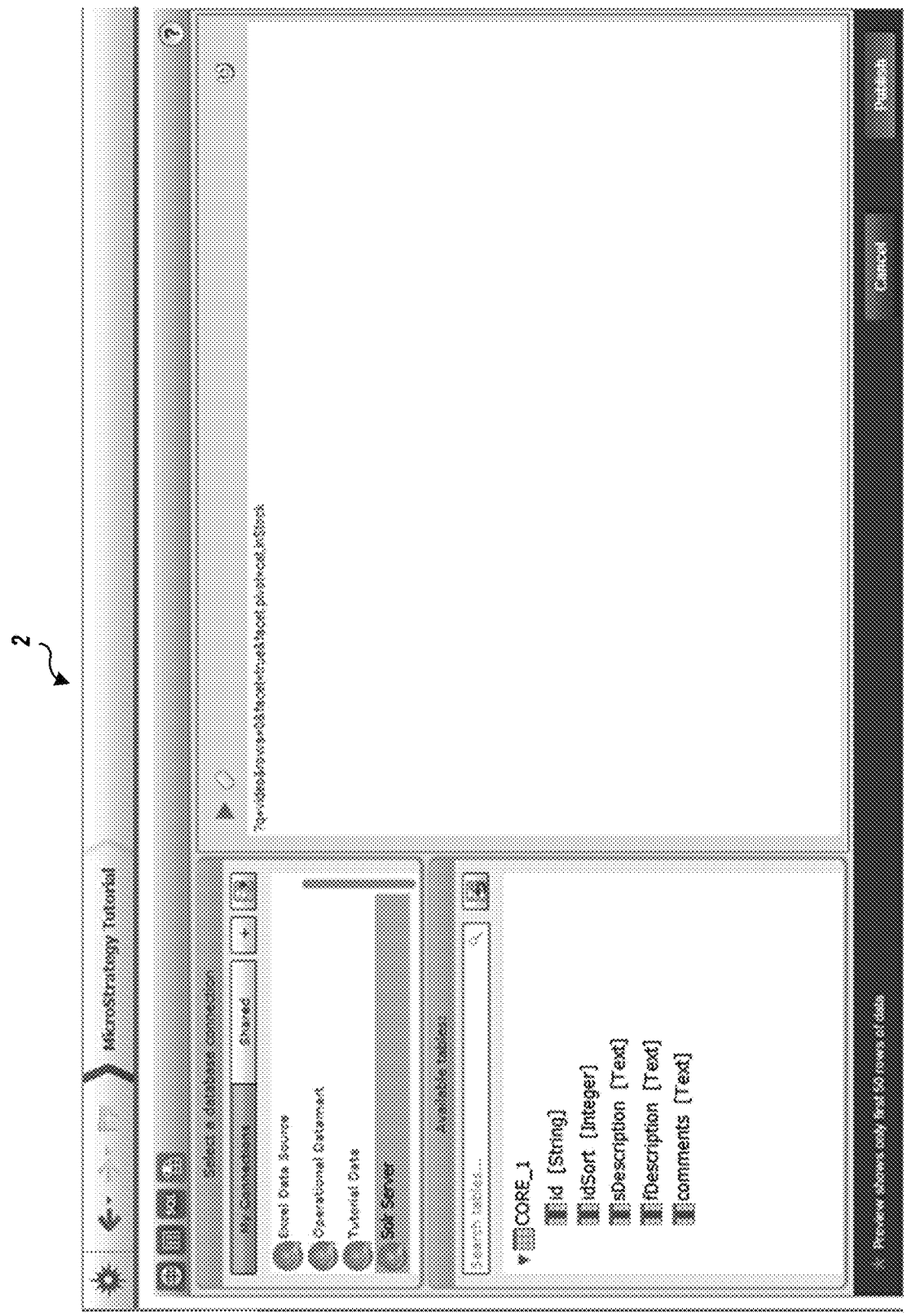
FIG. 1 illustrates an example user interface for browsing search index metadata.

Techniques are described for a system that is configured to connect and interact with a servlet embedded in a web server in a manner that promotes faster data retrieval and searching. The system provides dynamic search query generation, incremental results retrieval, and a search box that is not specific to any attribute.

In some implementations, the system is configured to treat search as a data source. In these implementations, the system may perform natural language processing grid/report creation, may extend metadata object search to report caches, and may perform attribute element searches using search selectors across multiple attributes. Further, in these implementations, the system may use search as the analytic paradigm for unstructured and semi-structured data. The unstructured data searched may include free text, posts and comments, etc., and the semi-structured data may include event log data, strings of key-value pairs, and any attributes (e.g., keys) that are not fully known prior to the time of analysis.

The system also may search some structured data. The structured data may include numerous, but sparse, characteristic attributes, BigTable-like structures, etc. A relational database is to structured data as a search Index in the system is to unstructured and semi-structured data. The system may use a search server (e.g., Solr) as a "database" that speaks search, instead of a structured query language (SQL).

In some examples, a database server may integrate with a search server (e.g., Solr). In these examples, the database server may perform web services in which the database server sends prompted queries to the search server (e.g., Solr) and retrieves results. The database server handles request submissions and results manipulation, and no authentication is necessary.

For example, an error tracking and management system database (e.g., Total Quality Management System) may be indexed via a search server (e.g., Solr). In this example, a mix of structured fields (status, event, etc.) and unstructured fields (short description, long description, case comments, etc.) exists. And, in this example, the indexed error tracking and management system database may provide an issue count dashboard that show a number of issues over time relevant to "derived elements." The indexed error tracking and management system database also may populate a result set via search and perform further subsetting in attribute elements by getting the set of issues relevant to "derived elements" and analyzing from there. The indexed error tracking and management system database further may perform search-as-filter by combining results from search over unstructured data with SQL queries over structured data. In this regard, the indexed error tracking and management system database may display maintenance revenue by year for all customers who logged issues relevant to "derived elements."

In some implementations, a system implements search as a data source using a search server connector (e.g., a Solr connector) with a freeform search expression. In these implementations, the system defines a search server (e.g., a Solr server) as a database instance. The system browses metadata by reading a search server schema file (e.g., a Solr schema file) and the user enters only the search server uniform resource identifier (URI) (e.g., a Solr URI) in the freeform text. The search server connector (e.g., the Solr connector) calls an application programming interface (API) based on information in the database instance. The search server connector (e.g., the Solr connector) transforms results to a table format used by the system.

In some examples, the system may provide dynamic search query generation using a query builder for search. In these examples, the system operates as described above, but uses a graphical interface instead of a freeform URI.

The system also may perform incremental results retrieval. Instead of retrieving a full data set and displaying results, the search results may naturally return a preset number of rows at a time. The system further may use a text value selector in which a search box on a dashboard results in a new search API call to source. In the following disclosure, FIGS. 6-12 and the associated descriptions related to search integration technology that may be used to integrate structured data and unstructured data. Thereafter, search integration features that may be implemented using the systems described with reference to FIGS. 6-12 are discussed in more detail with reference to FIGS. 1-5, 13, and 14.

FIG. 1 illustrates an example user interface 2 for browsing search index metadata. The user interface 2 may be output by the search system described above. As shown in the "Select a database connection" section, each search server (e.g., Solr server) may be modeled as a database instance. Also, a user enters a search query as a freeform string. As shown in the "Available tables:" section, each core (e.g., search index) appears with a list of available fields from the index. This information is retrieved from the search server schema file (e.g., Solr schema file) and presented.

Figure 2:
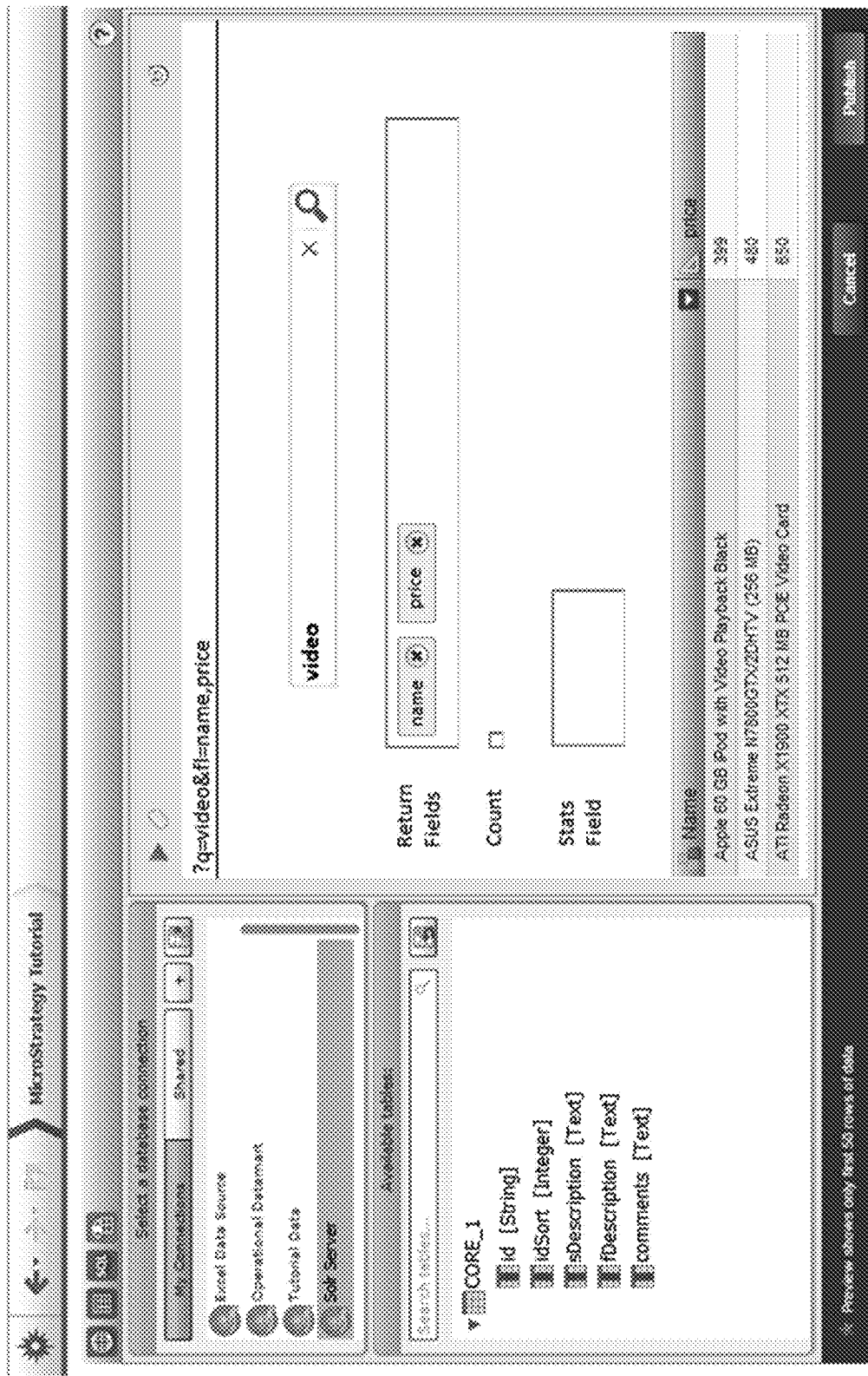
FIG. 2 illustrates an example user interface of a graphical query builder for search.

FIG. 2 illustrates an example user interface 4 of a graphical query builder for search. The user interface 4 may be output by the search system described above. The user interface 4 shows a dynamically-generated search string that is automatically generated based on the text entered in the text input control, the return fields entered in the return fields input control, the count check box, and the stats field. The return fields input control defines facets or fields to be returned by the search. The stats field is a field on which to calculate Sum, Min, Max, etc. If the stats field is left empty, no stats are computed. As shown, the dynamically-generated search string was generated based on the text "video" entered in the text input control and the fields "name" and "price" entered in the return fields input control.

Figure 3:
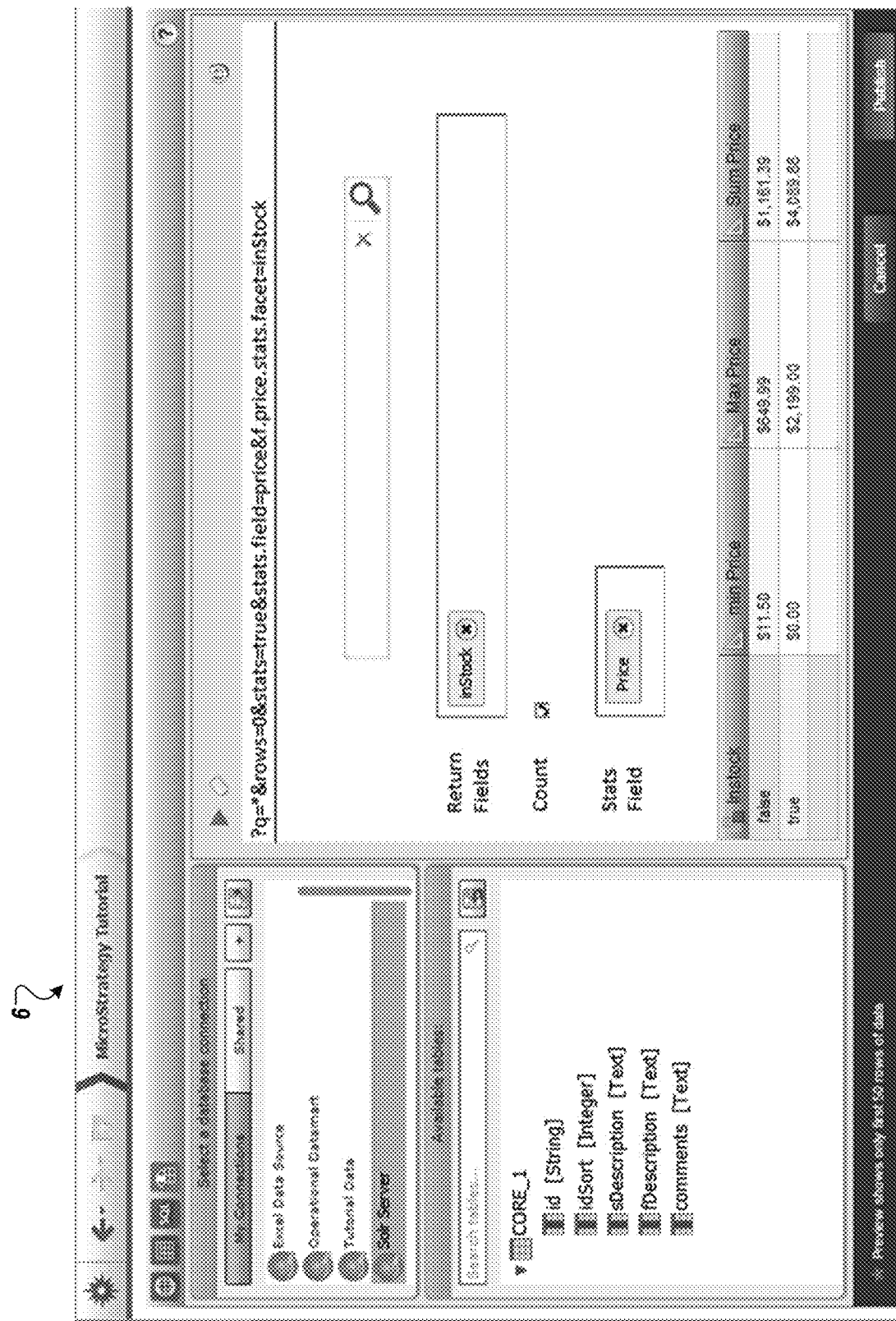
FIG. 3 illustrates another example user interface of a graphical query builder for search.

FIG. 3 illustrates another example user interface of a graphical query builder for search. The user interface 6 may be output by the search system described above. The user interface 6 shows a dynamically-generated search string that is automatically generated based on the text entered in the text input control, the return fields entered in the return fields input control, the count check box, and the stats field. The return fields input control defines facets or fields to be returned by the search. The stats field is a field on which to calculate Sum, Min, Max, etc. If the stats field is left empty, no stats are computed. As shown, the dynamically-generated search string was generated based on no text entered in the text input control, the field "inStock" entered in the return fields input control, the check of the count check box, and the field "Price" entered in the stats field input control.

Figure 4:
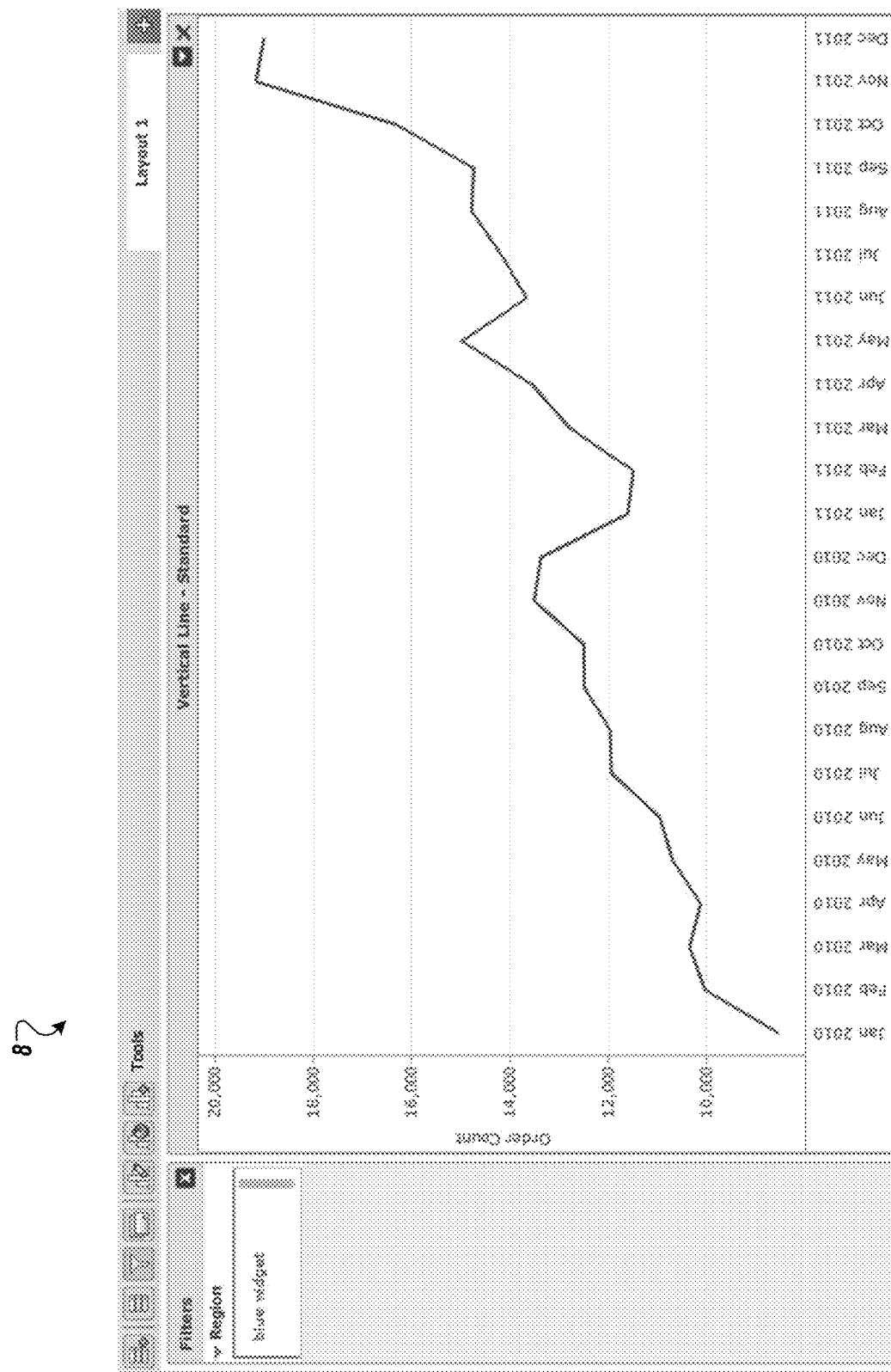
FIG. 4 illustrates an example user interface for search with a search selector for multiple attributes.

FIG. 4 illustrates an example user interface 8 for search with a search selector for multiple attributes. The user interface 8 may be output by the search system described above. The user interface 8 includes a search box that is not specific to any attribute. When search terms are entered in the search box, the system parses the search terms into multiple unit conditions, each of which is an attribute element list qualification, and performs a search based on the parsing.

In some implementations, the system performs natural language processing report or grid creation. In these implementations, the system may receive user input, such as "northeast sales for 2012 by month." The system then generates queries based on natural language processing of the received user input. For instance, for the user input "northeast sales for 2012 by month," the system generates a Template: Month attribute on rows, Sales metric on columns, and a Filter: Region IN {Northeast} AND Year IN {2012}.

Figure 5:
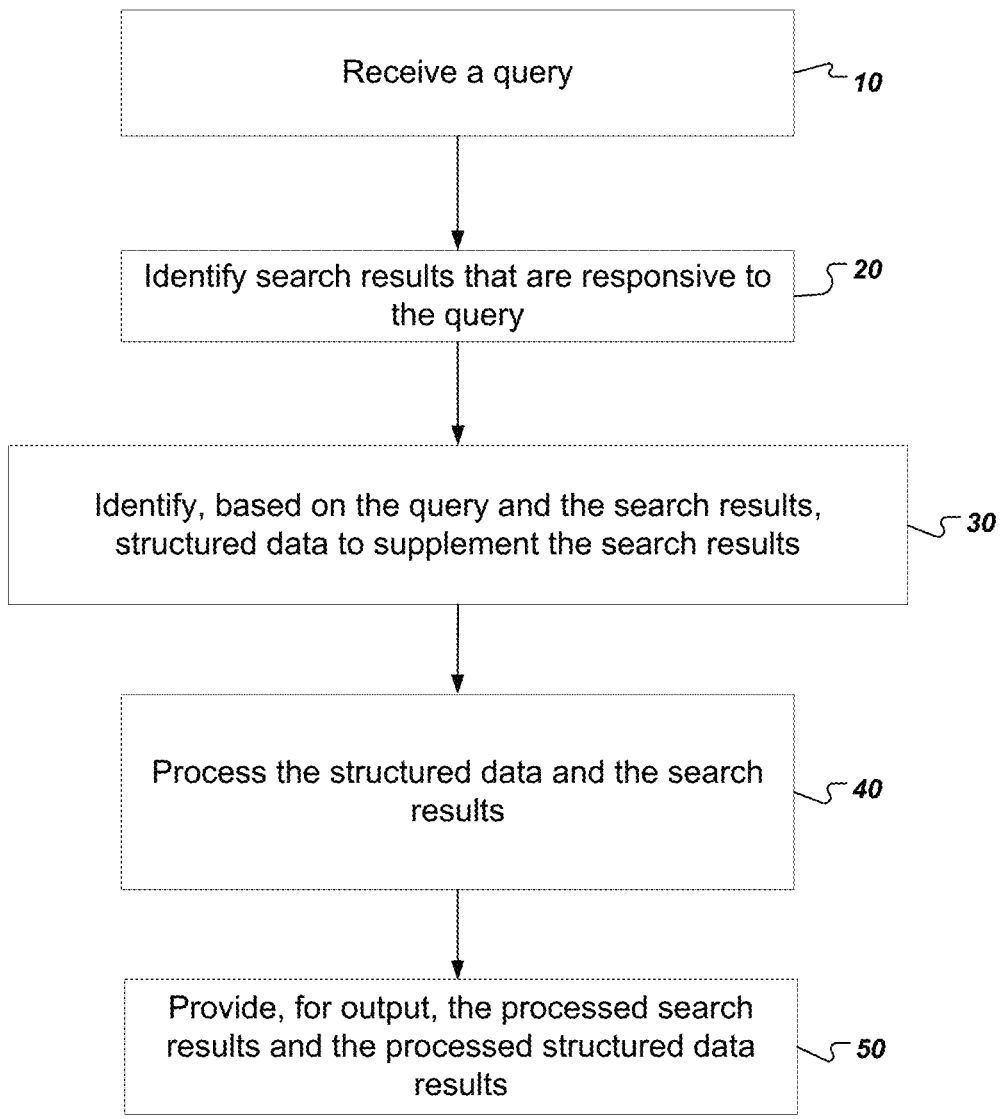
FIG. 5 illustrates an example process for integrating structured data and unstructured data in providing query results.

FIG. 5 illustrates an example process for integrating structured data and unstructured data in providing query results. In general, the process is performed by a computing device, for example, a computer system. The system integrates structured data (e.g., tables in a relational database) and unstructured data (e.g., files indexed by a search index) to identify results to a query.

The system receives a query (10). In some implementations, the query is a natural language query received through a dashboard application. For example, the query may be "identify servers with a buffer overflow error and the impact that error had on each organization." As another example, the query may be "identify customers who included 'not recommend' in their comments."

The system identifies search results that are responsive to the query (20). In some implementations, the system identifies the search results in unstructured or semi-structured search data using a search index. For example, a crawler may have indexed server log files as unstructured or semi-structured search data, and the system identifies, using the search index, the log files that contain the buffer overflow error. As another example, a crawler may have indexed web pages that contain comments left by users of a shopping website unstructured or semi-structured search data, and the system may identify the comments that include "not recommend." Any type of unstructured or semi-structured search data may be searched in satisfying the query.

The system identifies, based on the query and the search results, structured data to supplement the search results (30). For instance, the system supplements the search of the unstructured or semi-structured search data with structured data, such as data from a relational database. For example, to determine the impact of a server error on different organizations, the system identifies structured data that includes a table that maps each server to a particular organization within a company. In this example, through the integration of searching unstructured data and structured data, the system provides search results that indicate the impact of server errors on particular organizations, which is information that is only available through a combination of unstructured and structured data. As another example, the structured data may include a customer database that includes demographic data for each customer who has purchased an item from the shopping website. In this example, the demographic data is added to the results from a search of the unstructured to provide fuller results with more information.

The system processes the structured data and the search results (40). For example, the system may identify the username that is associated with each comment and examine the customer database to determine demographic data of the customers who included "not recommend" in their comment. As another example, the system may identify the organization that was affected by the server error. The system may further identify computer use data for each employee in the organization. The system may compare the employee computer use data for days when the server error occurred to employee computer use data for days when the server error did not occur. In some implementations, the system may perform analytics, filtering, aggregation, wrangling, searching, data mining, text analytics, on demand loading, incremental refreshing, streaming, data blending, complex ETL workflows, or multi-sourcing on the structured data and the search results.

The system provides, for output, the processed search results and the processed structured data results (50). In some implementations, the system provides the processed search results and the processed structured data results to an in-memory engine. The system may request additional processing of the processed search results and the processed structured data results by the in-memory engine. In some implementations, the system provides the processed search results and the processed structured data results to the dashboard application. The system may provide a graphical representation of the processed search results and the processed structured data results such as bar graphs, line graphs, and pie charts.

Figure 6:
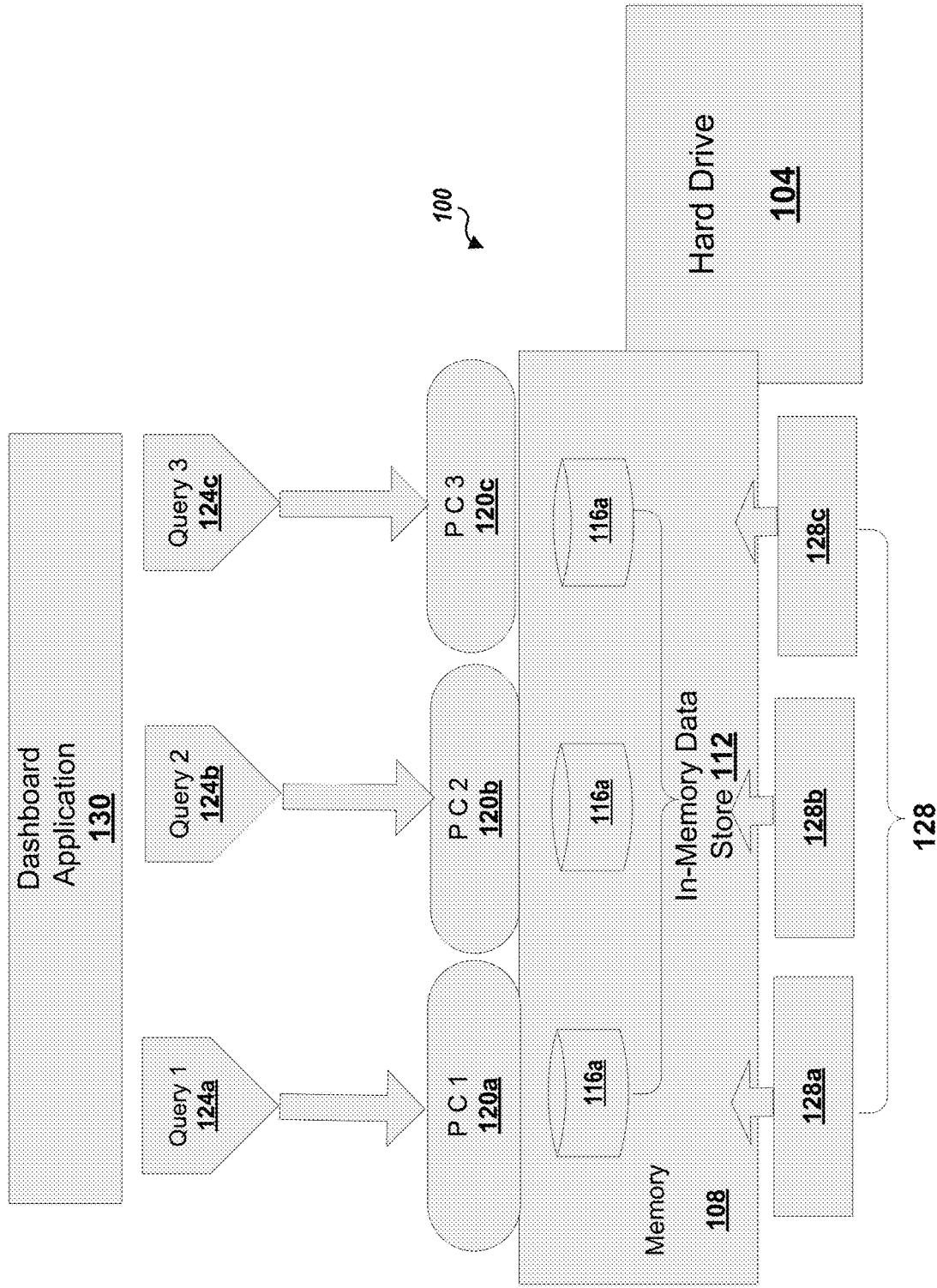
FIG. 6 is a block diagram of an example architecture of an in-memory analytic data store.

FIG. 6 shows an example conceptual diagram of a computer system described as performing the process shown in FIG. 5. For example, computer system 100 can be implemented on one or more computers (or nodes). As shown, computer system 100 can be conceptually represented as having two data storage areas, a hard disk 104 and a memory 108. The computer system 100 includes a dashboard application 130. Dashboard application 130 can include an interface (as described in detail below) for displaying grids and graphs based on underlying data to a user.

For example, memory 108 can be a random access memory or a flash memory. In some implementations, memory 108 allows data items to be read and written in a substantially similar amount of time regardless of an order in which the data items are access. In this regard, memory 108 can be different from, for example, hard disk 104 where the time to read and write data items can vary significant depending on the physical locations of the data items in the recording medium and because of, e.g., mechanical limitations such as media rotation speeds and arm movement delays.

Memory 108 includes an in-memory data store 112. For example, the in-memory data store can be partitioned into one or more data sub sets 116a-c. For example, one or more data sub sets 116a-c can include partitions (e.g. a portion) of one or more tables within data store 112. Although three data sub sets 116a-c are shown and described here, there can be fewer or more (perhaps several more) than the three data sub sets 116a-c. Each data sub set 116a-c is associated with one or more processing units 120a-c. Although three processing units 120a-c are shown and described here, there can be fewer or more (perhaps several more) than the three processing units 120a-c. In some examples, a processing unit 120a can be associated with more than one data sub set 116a-c.

For example, processing units 120a-c can be one or more processor cores of a multi-core processor. For examples, multi-core processors can have two cores (dual-core CPUs, for example AMD Phenom II X2 and Intel Core Duo), four cores (quad-core CPUs, for example AMD Phenom II X4, Intel's i5 and i7 processors), six cores (hexa-core CPUs, for example AMD Phenom II X6 and Intel Core i7 Extreme Edition 980X), eight cores (octo-core CPUs, for example Intel Xeon E7-2820 and AMD FX-8350), ten cores (for example, Intel Xeon E7-2850), or more. In some implementations, a multi-core processor implements multiprocessing in a single physical package.

In some implementations, the computer system 100 can be implemented across multiple nodes. For example, a first processing unit 120a can each be a processor core of a multi-core processor in a first node, and a second processing unit 120b can be a processor core of a multi-core processor in a second, different, node. In some implementations, while processing unit 120a is physically located in a first node (e.g. a first processor core in the first node), processing units 120b and 120c can be physically located in a second, different node (e.g. second, different processor cores in the second node). In some implementations, data sub set 116a can be physically located in the first node, and data sub sets 116b and 116c, corresponding respectively to each of processing units 120b and 120c, can be physically located in the second, different node. Although a few example combinations of processor cores and partitioned data sets are described here, a person of ordinary skill in the art would understand that any number of combinations of processor cores and partitioned data sets, spread out over a single node or multiple nodes, are possible.

In some examples, one or more database transactions can be processed in the form of one or more queries 124a-c to the in-memory analytic data store 112. For example, a high level database transaction can be divided into the multiple queries 124a-c. In some examples, the number of queries 124a-c can be as high as a number of parallel processing units 120a-c that are available to process the queries 124a-c in parallel. As shown, the queries 124a-c can be processed in parallel by the respective processing units 120a-c. For example, query 124a may require the summation of a column of data (e.g., numbers) residing in a portion of the data sub set 116a. For example, the column of data relates to sales made by a customer over a period of time. This summation operation can be handled by respective processing unit 120a. Substantially at the same time, a different (but perhaps related) operation, e.g. retrieving transaction dates for the sales fields being processed through the summation operation, can be handled by processing unit 120b operating on data sub set 116b. The results from respective queries 124a and 124b can be sent back to a query engine (see e.g. FIG. 3 described in further detail below) to assemble the information for, e.g., final display. In some implementations, the second simultaneous operation is typically the same as the first and a single logical operation is divided among multiple partitions. For example, the operation may be to sum a group of 100 numbers, but physically there are 5 operations, each of which sums a group of 20 of the 100 numbers. Therefore, each operation is a sum.

For example, computer systems implementing the techniques described herein (e.g. computer system 100 of FIG. 6) uses information about an application and/or design aspects of a dashboard application 130 to generate queries 124a-c to the in-memory data store. For example, dashboard application 130 can include a dashboard interface, as described in detail below, in which two or more grids (e.g. tables of data) are based on same or similar content. In some implementations, the computer system 100 can cause a single combined query (e.g., only query 124a) or parallel queries (e.g., queries 124a-c) to be executed on the in-memory data store for the two or more grids. In some implementations, dashboard application 130 can have two visualizations representing, e.g. sales trends over time through both a line chart and a grid of data. In the computer system 100, the data needed for the two visualizations can be the same and so can be based on a either a single query or multiple parallel queries to in-memory analytic data store 112. In some examples, dashboard application 130 can include two visualizations (not shown) based on selecting key performance indicators (KPIs) from a same set of underlying data in in-memory data store 112. Because the underlying data involved is the same, the visualizations can be executed together—i.e. a single query or multiple parallel queries can be executed together. In some implementations, dashboard application 130 can include visualizations that are based on same or similar filtering criteria, and as such queries corresponding to these visualizations can be combined into a single query and/or executed together.

In some implementations, a data service engine 128 can receive data from multiple high volume data storage systems and load the received data into in-memory data store 112. In some examples, data service engine 128 can perform parallel data loading into data store 112 through parallel processes 128a-c. For example, processes 128a-c can load data from a corresponding data sources (not shown) into respective in-memory data store sub sets 116a-c in parallel. In some implementations, the loaded data can be all of the market intelligence data needed to generate output for an end application, e.g., a dashboard/visualization engine as described in further detail below.

The in-memory analytic data store 112 can enable bigger data volume given its partitioned and parallel processing structure. For instance, current in-memory technologies are limited to two billion rows. By dividing datasets into partitions (e.g., data store sub sets 116a-c), each partition or sub set 116a-c can have up to two billion rows, which increases the overall data volume. The partitioning can be performed on a single node or over multiple nodes as described below. For single node partitioning, data partitions are distributed across multiple cores on a single machine and grids/views are processed in parallel across all cores on a single multi-processor node. For multiple node partitioning, data partitions are distributed within and across multiple nodes (e.g., machines) and queries processed in parallel within and across multiple nodes.

In some implementations, the in-memory analytic data store 112 can provide broader analytic functionality. For instance, current in-memory cubes do not support full filter and metric functionality. In current in-memory cubes, "single pass" queries can be executed on underlying data. As such, complex business questions, such as, returning regional sales for those customers that bought certain widgets worth more than a predetermined number, could not be run on the data. The in-memory analytic data store 112, however, extends to "multi-pass" analytics with multiple levels of aggregation and/or filtering. For example, computer system 100 can process metrics having conditions. In some examples, computer system 100 can also set qualification filters on the data.

Figure 7:
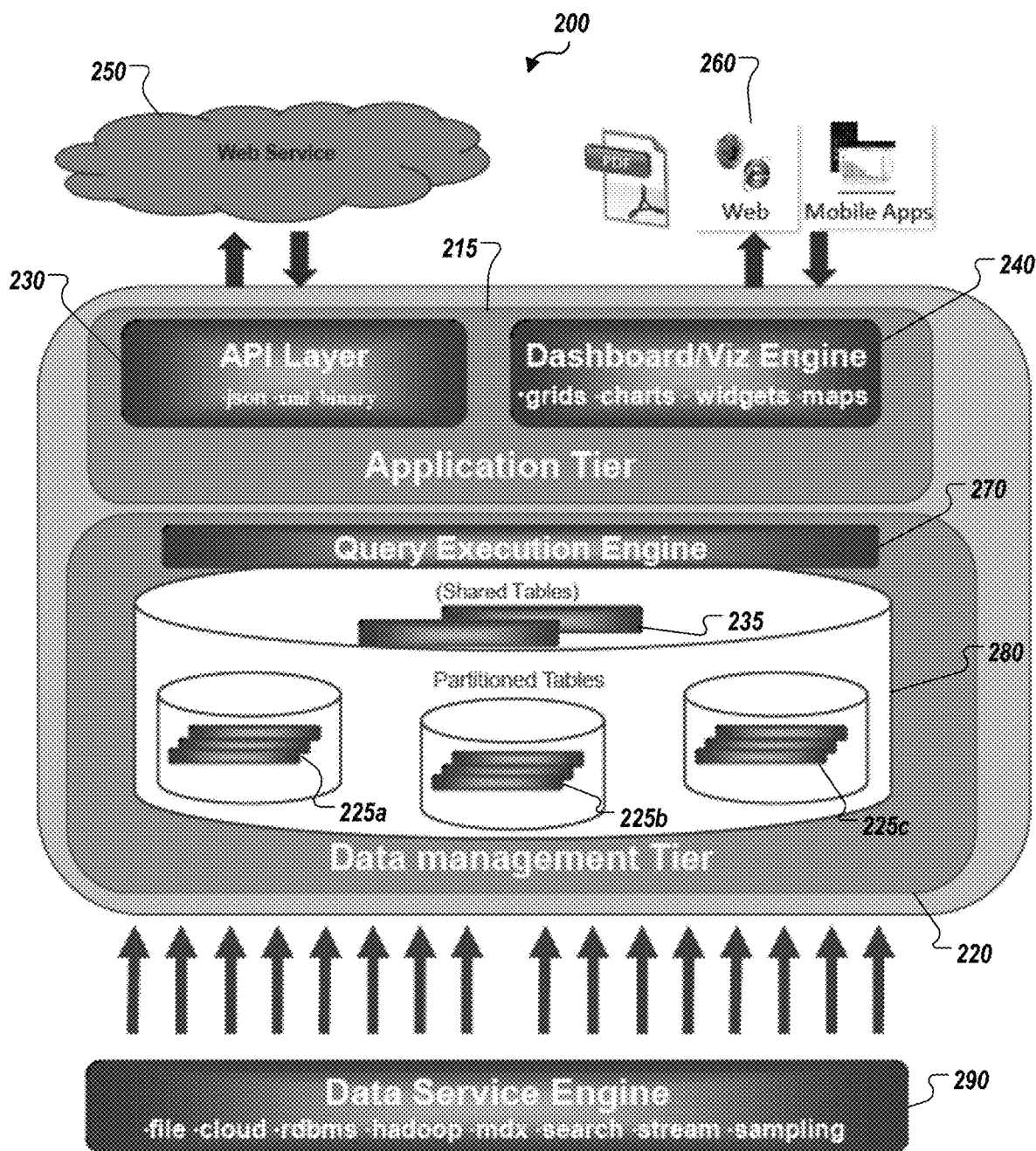
FIG. 7 is a block diagram illustrating an example architecture of a node.

In some implementations, the computer system of FIG. 6 can be implemented on a single node. Referring to FIG. 7, an example architecture of a single node 200 is shown. Node 200 can be a server implementing an in-memory analytic data store 280. Node 200 can include an application tier 215, a data management tier 220, and a data service engine 290. Application tier 215 includes an application programming interface (API) layer 230 and an intelligence dashboard/visualization engine 240. For example, API layer 230 includes specifications describing how components in data management tier 220 can interact with other components, e.g., one or more web services 250. For example, API layer 230 interfaces with web services 250 to receive data from one or more other applications (e.g., market intelligence data) and/or to provide collaborative functionality with the one or more other applications (e.g., receive user input from the one or more other applications and provide data to be output by the one or more other applications).

Figure 9:
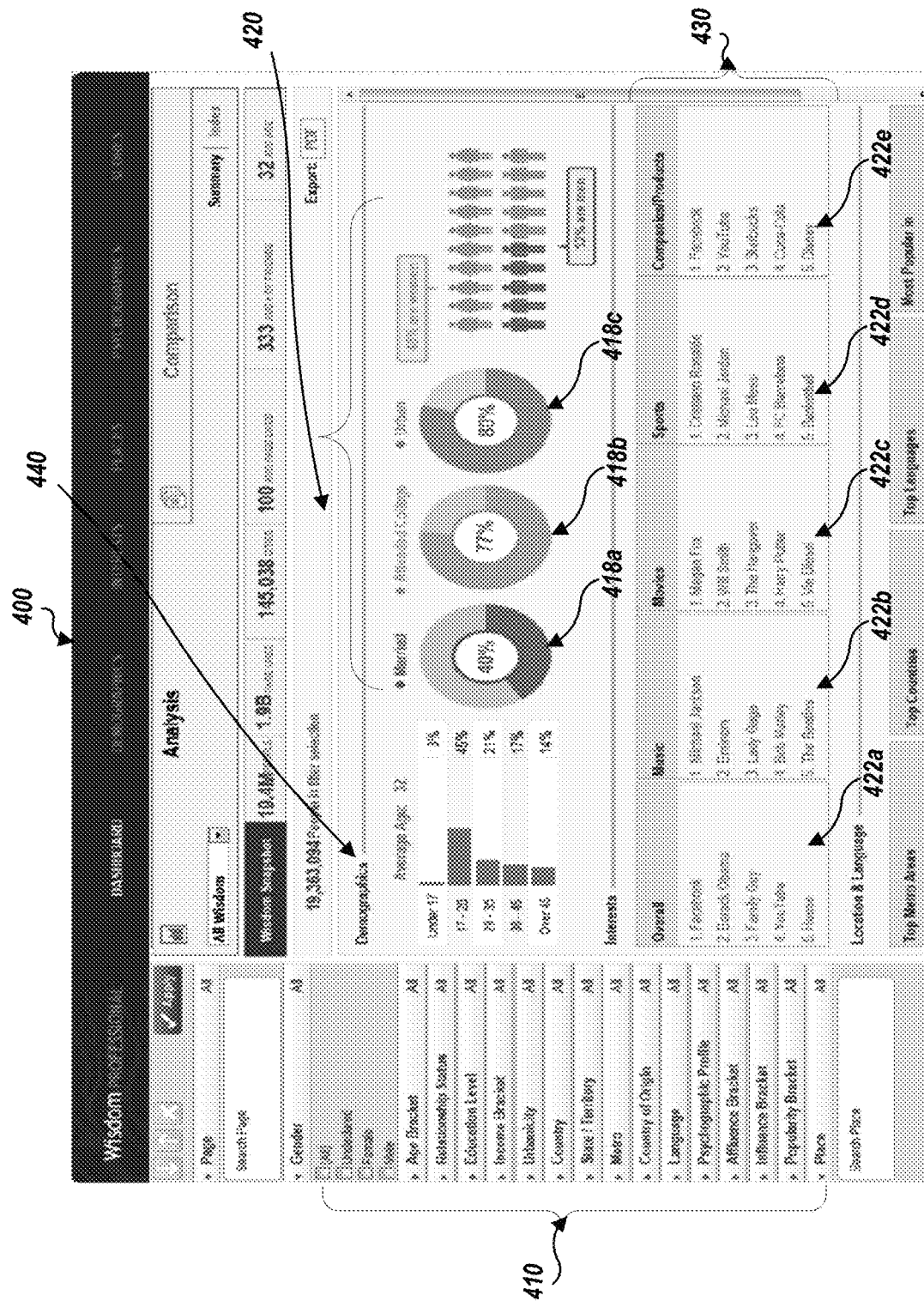
FIGS. 9 and 10 illustrate example user interfaces of an intelligence dashboard.

Dashboard/visualization engine 240 interacts with one or more of web applications, mobile applications, and documents 260 to receive user input and provide user output. For instance, dashboard/visualization engine 240 can generate a user interface 400 as shown in FIG. 9. For example, dashboard/visualization engine 240 can interact with a web or mobile application to output the user interface 400 on a user's device, e.g. a handheld device. Dashboard/visualization engine 240 also can output user interface 400 as a document or file that a user device is able to store and display. Application tier 210 can be a tightly-coupled with globally optimized query execution across multiple visualizations in single dashboard. Application tier 210 can also include a "data-only" JSON REST API and can provide super-fast search-style selectors.

Data management tier 220 can include a query execution engine 270 and an in-memory data store 280. Query execution engine 270 receives queries (similar to queries 124a-c described in connection with FIG. 6) from application tier 210 and processes the received queries on data stored in in-memory data store 280. Query execution engine 270 can access data from the in-memory data store 280, perform analytics on the accessed data, and provide, to the application tier 215, the accessed data and/or the results of the performed analytics. In some implementations, query execution engine 270 can divide a database transaction into a plurality of queries for processing on the respective data partitions.

In-memory data store 280 can be partitioned as shown. In some implementations, in-memory data store 280 can be partitioned to include, e.g., multiple partitioned tables 225a-c and one or more shared tables 235 that are stored in-memory. In some implementations, while each of the partitioned tables 225a-c is associated with a corresponding processor core, shared tables 235 can be accessed by multiple processor cores at substantially the same time. For example, the in-memory data store 280 can include a customer transactions table that can be partitioned such that each of the partitioned tables 225a-c has one million customer transaction entries. In some implementations, a shared table can be a customer table that is shared among two or more processor cores.

Query execution engine 270 is configured to process queries to multiple partitioned tables 225a-c and one or more shared tables 235 in parallel to provide fast data retrieval and enable a larger volume of data to be stored in-memory. For example, partition tables 225a-c can include a plurality of customer transaction records. Data management tier 220 can be a high-performance in-memory data tier that performs distributed in-memory analytics on the customer transaction records.

As explained above, data management tier 220 can have data partitioned across multiple processing cores and can perform parallel execution of queries across all cores according to a partition logic. In some implementations, a partition attribute can be defined to couple the processing cores to the respective data partition table e.g., any one of partition tables 225a-c. For example, if a partition table 225a contains customer transaction information, a customer transaction attribute such as a transaction identification code ("ID") can be used as a partition attribute. In this regard, in some examples, the transaction ID can be processed through a hash function and sent to partition tables 225a-c to determine which partition 225a-c has the corresponding transaction information. In some implementations, while multiple customers can be located in a partition table 225a, a customer located on partition table 225a can remain on that partition table 225a indefinitely (e.g., until the customer record is reallocated elsewhere).

Data service engine 290 can receive data from multiple high volume data storage systems and load the received data into the in-memory data store 280 in the data management tier 220. The data service engine 290 can perform parallel data loading into the in-memory data store 280 from multiple data sources. The loaded data can be all of the market intelligence data accessible to generate output through the dashboard/visualization engine 240. For example, data service engine 290 loaded information can be based on one or more of information contained on files, the cloud, a relational database management system (RDMBS), information from Apache Hadoop (an open source software framework for large scale storage and processing of data), multidimensional expressions (MDX), search query results, stream, and sampling information.

In some implementations, any arbitrary schema can be loaded into the in-memory analytic data store. In some implementations, the in-memory analytic data store 280 can be loaded with multiple star schemas and not just a single star schema. A star schema organizes a database such that business process data is separated into facts, which hold measurable, quantitative data about a business, and dimensions which are descriptive attributes related to the facts. For example, facts can include sales price, sale quantity, and time, distance, speed, and weight measurements. Related dimension attribute can include product models, product colors, product sizes, geographic locations, and salesperson names. In one star schema, the data is organize such that the fact table is typically located at the center of the star schema with the dimension table surrounding the fact table. Thus, multiple star schemas can each have a facts table at its center and a plurality of associated dimensional tables surrounding the facts tables.

In some implementations, fact tables at multiple levels can be loaded into the in-memory analytic data store. As an illustration, a first star schema can include sales transactions information, including customer information, transaction detail at a timestamp level, and store of purchase information. A second star schema can include store inventory information, such as products information, sales associates' information, and purchase information at a weekly inventory level. A third star schema can include corporate-level pricing data. Thus, each star schema represents data at a different level of granularity and detail. In some implementations, the in-memory analytic data store 280 can be loaded with all such star schemas.

Figure 8:
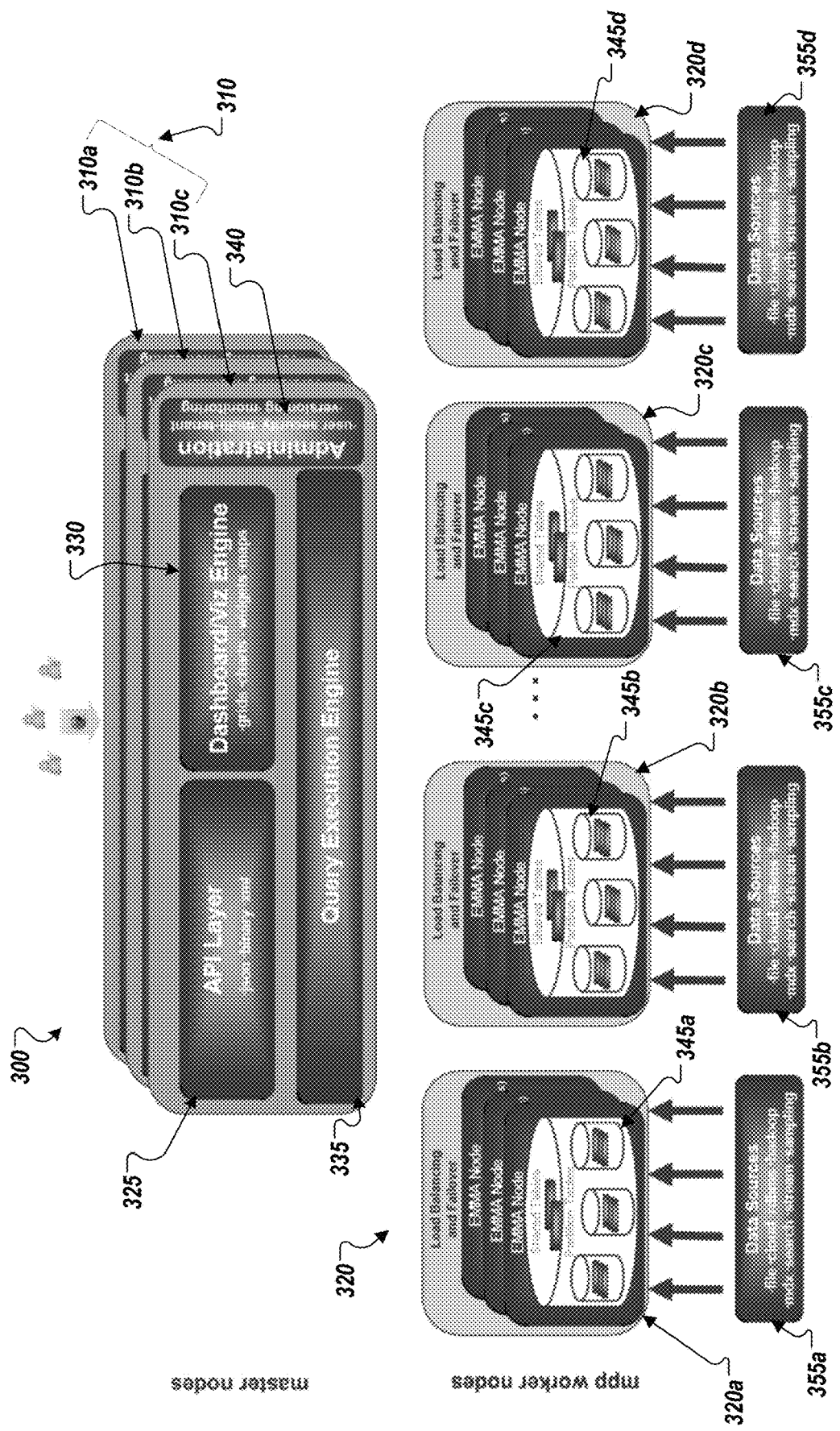
FIG. 8 is a block diagram illustrating an example system with multiple nodes.

FIG. 8 illustrates an example system 300 with multiple nodes 310, 320. The system 300 includes master nodes 310, further delineated as master nodes 310*a-c*, and worker nodes 320, further delineated as worker nodes 320*a-d*. Although FIG. 8 illustrates three master nodes 310*a-c* and four worker nodes 320*a-d*, the system 300 can include more (perhaps, many more) or fewer master nodes 310*a-c* and worker nodes 320*a-d*.

As shown, each of the master nodes 310*a-c* includes an API layer 325, a dashboard and/or visualization engine 330, a query execution engine 335, and an administration engine 340. The API layer, dashboard/visualization engine 330, and query execution engine 335 can be similar to the API layer 230, the dashboard/visualization engine 240, and the query execution engine 270 described above with respect to FIG. 7, except with for query execution engine 270 operating over multiple, different worker nodes 320*a-d*. Administration engine 340 handles administration functionality for the corresponding master node 310, including user security, multi-tenant administration, versioning, and process monitoring. Each of master nodes 310*a-c* can be operated on a separate machine.

As shown, each of the worker nodes 320*a-d* includes a corresponding in-memory analytic data store 345*a-d*, each of which can be similar to the in-memory data store 280 described above with respect to FIG. 7. Each of worker nodes 320*a-d* can perform load balancing and failover operations for its own in-memory analytic data store nodes and/or across all of the worker nodes 320. In this regard, in some implementations, a status of a node is monitored. If, for example, a node (or a core within the node) fails or the load on a node (or a core within the node) exceeds a predetermined maximum, its load is immediately redistributed across the remaining nodes (or cores). For example, if an abnormal condition state is detected with respect to one or more nodes (or cores in the nodes), a failover can be effected to another one of the plurality of nodes (or processor cores) to ensure continued operation.

Each of the worker nodes 320*a-d* can receive data from multiple large volume data sources and load the received data in parallel as described above. For example, each worker node 320*a-d* can be in communication with one or more corresponding data sources 355*a-d*. Although FIG. 8 illustrates a one-to-one correspondence between worker nodes 320*a-d* and data sources 355*a-d*, it should be understood that any variation of relationships between the worker nodes 320-*a-d* and data sources 355*a-d* is possible. For example, a single data source, e.g., data source 355*a* (say, a Hadoop system), can provide data to all four worker nodes 320*a-d*. The data sources 355*a-d* can include high volume data storage systems. Accordingly, a data services engine (e.g. data service engine 290 of FIG. 7) can load data from the data sources 355*a-d* in parallel into the in-memory data stores 345*a-d*. In some implementations, the loaded data can be all of the market intelligence data needed to generate output through a dashboard/visualization engine.

In some implementations, the raw data from one or more information sources, e.g., a Hadoop system, can be processed before being loaded (e.g. via data service engine 290 of FIG. 7) to an in-memory analytic data store. An example implementation of an interface for such processing is described in U.S. provisional Application No. 61/932,099, filed Jan. 27, 2014.

The system 300 can be configured differently depending on the type of application and the amount of data needed to support the application. For instance, for a market intelligence application that uses 2.2 billion rows, the system 300 can have a memory footprint of 59 GB and can have a hardware configuration of a single server with 32 cores and 1 TB of RAM. For a social media application that uses 2.8 billion rows, the system 300 can have a memory footprint of 100 GB and can have a hardware configuration of a single server with 40 cores and 1 TB of RAM. For an e-commerce application that uses 3.8 billion rows, the system 300 can have a memory footprint of 500 GB and can have a hardware configuration of a single server with 80 cores and 1 TB of RAM. For a social media application that uses 80 billion rows, the system 300 can have a memory footprint of 5-6 TB and can have a hardware configuration of 100 worker nodes, each with 16 cores and 144 GB of RAM, which results in a total of 1600 cores and 14 TB of RAM.

The system 300 can be configured to support use case characteristics with data volume in the 100's of GB to 1 TB range. In these cases, the system 300 can provide fast response time, as all executions are against in-memory datasets and datasets and queries are partition-friendly. The system 300 can serve mostly external-facing applications, although some applications can be internal. The data volume that can be handled by system 300 may not be limited to a particular size, such as 1 TB. In fact, depending on the available nodes in system 300, a variety of data volumes can be serviced by system 300.

FIG. 9 illustrates an example user interface 400 of an intelligence dashboard. As shown, interface 400 comprises a plurality of control objects 410-440. For example, control objects include grids (e.g. data displayed in table format), graphs, text fields, shapes, etc. that users can use to navigate through the data presented through interface 400. Interface 400 can be powered by the in-memory analytic data store described throughout this disclosure (e.g., in-memory analytic data store 112 of FIG. 6). In this regard, in some implementations, the analytic data store powers an extensive market intelligence network that provides the data shown in user interface 400. For example, computer systems implementing the techniques described herein (e.g. computer system 100 of FIG. 6) uses information about an application and/or design aspects of dashboard 400 to generate queries to the in-memory data store.

For example, all of the market intelligence data used by and displayed through the intelligence dashboard interface 400 can be loaded into the in-memory analytic data store. In this example, user interface 400 receives user input defining filter criteria 410 related to the market intelligence information a user seeks. Filter criteria 410 can include demographics data or any other type of data as shown in interface 400 or otherwise available to filter the market intelligence data stored in the in-memory analytic data store. For example, the user may be able to filter the data by gender, age, relationship status, education level, income bracket, urbanicity, etc. A query execution engine (e.g. query execution engine 270 of FIG. 7) can receive the user input defining filter criteria 410, and execute queries (e.g. queries 124*a*-*c* of FIG. 6) to access the market intelligence data stored in an in-memory analytic data store. In some examples, the query execution engine can receive the accessed data (e.g. data from the in-memory analytic data that complies with the filter criteria 410), perform analytics on the accessed data, and output the results of the analytics to user interface 400.

As shown in FIG. 9, the user interface 400 specifies the demographic data used to generate the dashboard output broken down into various categories 420 (e.g. as shown in charts 418*a*-*c*) and outputs ranked lists of interests 422-*a*-*e* for people that fall within the demographic profile 440 defined by the filter criteria 410. For example, the categories 420 can include what percentage of the relevant population is married, has attended college, or lives in an urban area. Other types of output and data visualization can be used. In addition, the user interface 400 can receive additional user input to refine or change the filter criteria 410 or the results sought and the user interface 400 can dynamically update in short order given the in-memory data retrieval and processing that occurs responsive to the additional user input.

By way of example, FIG. 6 shows a user interface 500 of an intelligence dashboard also powered by an analytical in-memory data store (e.g., in-memory analytic data store 112 of FIG. 6). Interface 500 displays a customer report 505 to, e.g., a sales associate in a retail store. In an example, the sales associate can view the customer report 505 on a store computer.

In some examples, graphical user interface 500 includes customer portion 520 that displays information indicative of customers who are, e.g. in a particular geographic location (say, the retail store). Customer portion 520 displays customer information 520*a*-520*h*, with each item of customer information 520*a*-520*h* representing a customer. A user can select customer information 520*a*-520*h* by, for example, using a mouse to click on, or using a touch screen display to touch, a desired item of customer information 520*a*-520*h*. When an item of customer information 520*a*-520*h* is selected, interface 500 displays information pertaining to the selected customer. In the interface 500 of FIG. 10, a viewer of graphical user interface 500, e.g., the sales associate, has opted to view information associated with the customer represented by customer information 520*a*.

A query execution engine (e.g. query execution engine 270 of FIG. 7) can receive the user input, e.g., selection of customer information 520*a*-520*h*, and execute queries (e.g. queries 124*a*-*c* of FIG. 6) to access the market intelligence data stored in an in-memory analytic data store. In some examples, the query execution engine can receive the accessed data (e.g. data from the in-memory analytic data that complies with the filter criteria 410), perform analytics on the accessed data, and output the results of the analytics to user interface 500.

As shown, interface 500 includes past purchases link 502, selection of which causes interface 500 to display information indicative of past purchases of the customer that is selected via customer portion 520. Interface 500 also includes suggested items link, selection of which causes interface 500 to display suggestions information 504 indicative of suggested items that a particular customer (e.g., the customer selected from customer portion 520) may be interested in and want to purchase. Suggestions information 504 can based on analyzing data that is retrieved from an in-memory analytic data store. For example, suggestions information 504 can be based on customers' past purchases. Interface 500 includes shopping bag link 506, selection of which causes graphical user interface 500 to display items that a particular customer wishes to purchase. Interface 500 includes profile link 508, selection of which causes interface 500 to be updated to display a customer profile of a particular customer (e.g., the customer selected via currently present customer portion 520).

Interface 500 includes top occasions portion 510 that displays information (e.g., a graph) indicative of the top occasions for which a particular customer (e.g., customer 520*a*) has purchased merchandise. Information for top occasions portion 510 can be generated based on analytics performed on market intelligence data contained in an in-memory data store. In this example, top occasions portion 510 is generated by tracking past purchases of the customer and then categorizing the types of purchase (e.g., based on various occasions). In another example, top occasions portion 510 displays information indicative of the top occasions for a group of customers, e.g., rather than displaying the top occasions for a particular customer.

Interface 500 also displays top categories information 512, e.g., information specifying top categories of goods that have been purchased by a particular customer and/or by a group of customers at a retail store. Information for top categories portion 510 can be generated based on analytics performed on market intelligence data pertaining to the particular customer and/or the group of customers contained in an in-memory data store. In some implementations, interface 500 can include basket analysis portion 514—for display of information indicative of types of goods that are currently in an electronic shopping cart of a customer.

Graphical user interface 500 also includes spending history portion 516 to display information indicative of how much money a particular customer (e.g., the customer selected in portion 520) has spent with the retailer over a period of time. Information for spending history portion 516 can be generated based on analytics performed on market intelligence data pertaining to the particular customer contained in an in-memory data store. Spending history portion 516 can include a timeline 516*a*, e.g., a representation of the period of time over which spending is tracked. Spending history portion 516 also includes information 516*b* that specifies an average amount of money a particular customer has spent with the retailer over a period of time. Interface 500 also includes portion 518 for display of information indicative of past purchases and/or transactions of a particular customer.

Figure 11:
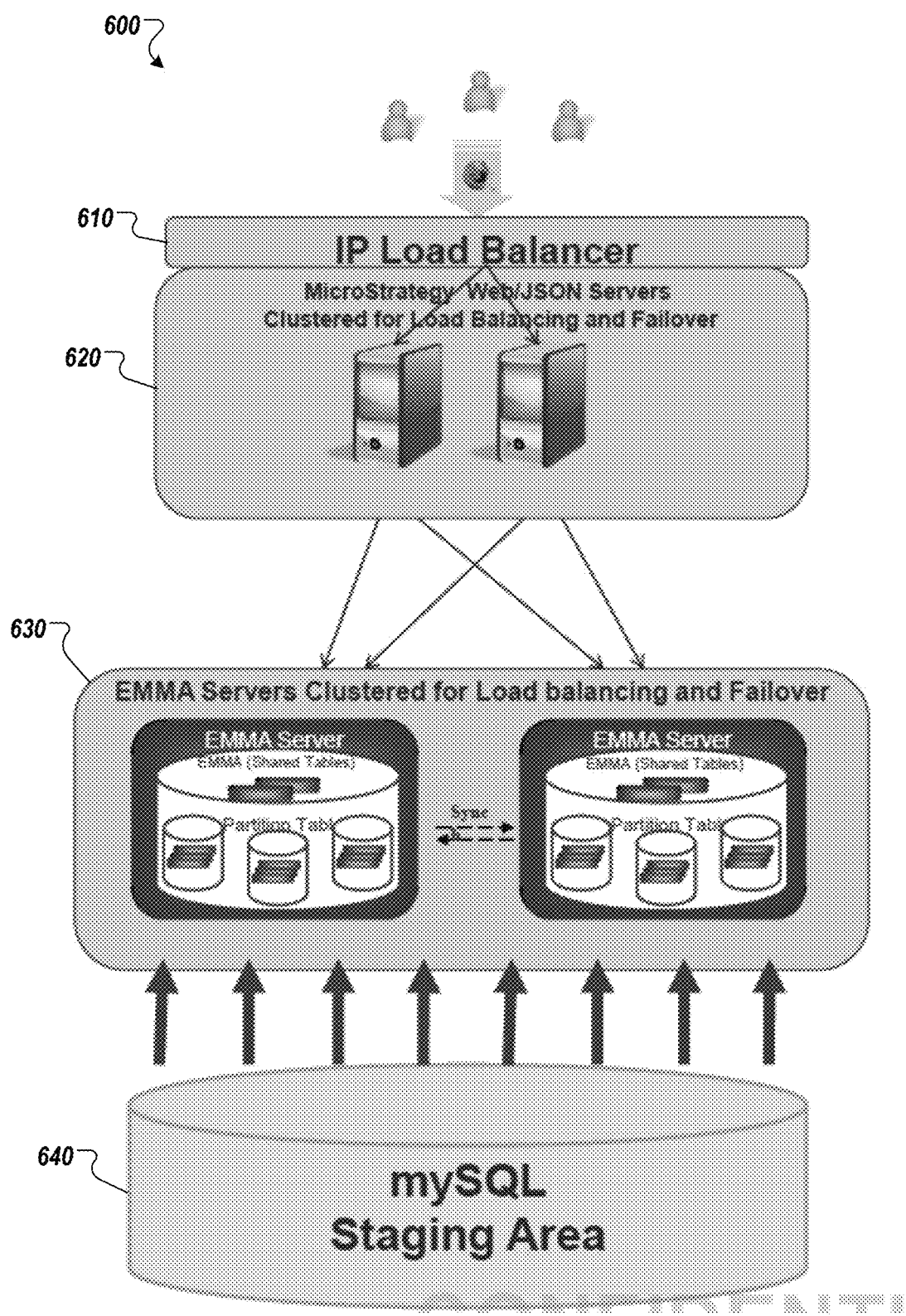
FIGS. 11 and 12 are block diagrams illustrating example topologies for applications leveraging an in-memory, distributed, analytic data store.
Figure 12:
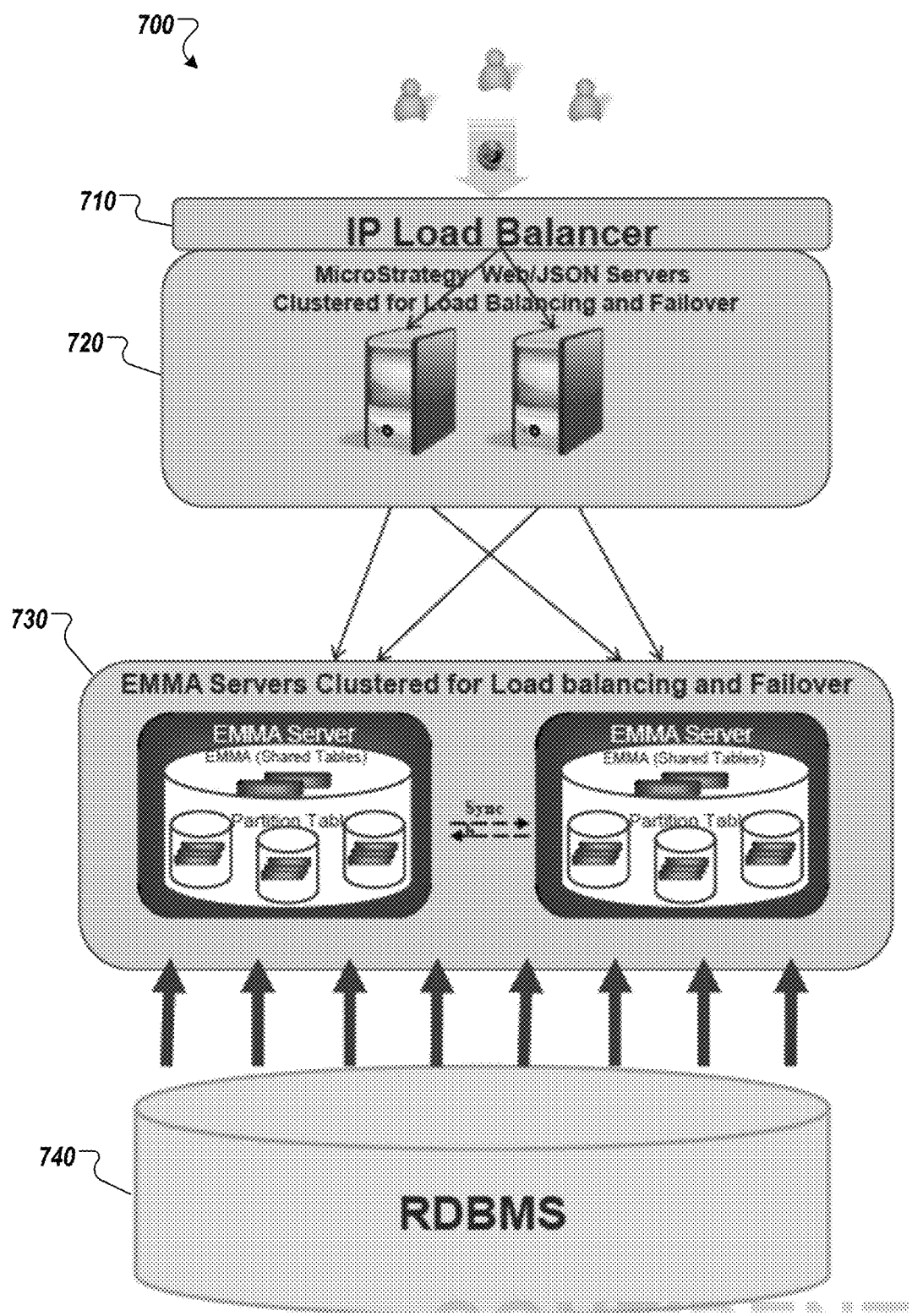

FIGS. 11 and 12 illustrate example topologies for applications leveraging an in-memory, distributed, analytic data store. In FIG. 11, an example topology 600 includes an Internet Protocol (IP) load balancer 610, multiple web server nodes 620, multiple in-memory analytic data store nodes 630, and a data staging area 640. The IP load balancer 610 receives user requests over the Internet and balances the user requests across the web server nodes 620. The web server nodes 620 process the user requests and access data needed to serve the user requests from the multiple in-memory analytic data store nodes 630. Each web server node can use the operating system RHEL 6.2, can have a 12 core Intel Xeon @ 2.24 GHz central processing unit, and can have 32 GB of RAM.

The multiple in-memory analytic data store nodes 630 store data in a partitioned manner and perform parallel processing of the partitioned data. The multiple in-memory analytic data store nodes 630 are clustered for load balancing and failover and serve queries/requests from the web server nodes 620. The multiple in-memory analytic data store nodes 630 communicate with one another to perform synchronization of changes made to the dataset. Each in-memory analytic data store node can use the operating system RHEL 6.2, can have a 32 core Intel Xeon @ 2.24 GHz central processing unit, and can have 1 TB of RAM. The full dataset can be replicated on each server.

The data staging area 640 accesses data to be loaded into the in-memory analytic data store nodes 630. The data staging area 640 stages the data in a manner that enables parallel loading of the data into the in-memory analytic data store nodes 630.

In FIG. 12, an example topology 700 includes an IP load balancer 510, multiple web server nodes 720, multiple in-memory analytic data store nodes 730, and a relational database management system (RDBMS) 740. The IP load balancer 710 receives user requests over the Internet and balances the user requests across the web server nodes 720. The web server nodes 720 process the user requests and access data needed to serve the user requests from the multiple in-memory analytic data store nodes 730. Each web server node can use the operating system Windows Server 2003 Enterprise x64 Edition (SP2), can have a Quad Core Intel Xeon L5520 @ 2.27 GHz central processing unit, and can have 6 GB of RAM.

The multiple in-memory analytic data store nodes 730 store data in a partitioned manner and perform parallel processing of the partitioned data. The multiple in-memory analytic data store nodes 730 are clustered for load balancing and failover and serve queries/requests from the web server nodes 720. The multiple in-memory analytic data store nodes 730 communicate with one another to perform synchronization of changes made to the dataset. Each in-memory analytic data store node can be a model Sun Fire X4800 M2 server, can use the operating system RHEL 6.1, can have an 80 core Intel Xeon @ 2.40 GHz with hyper threading central processing unit, and can have 1 TB of RAM. The full dataset can be replicated on each server.

The RDBMS 740 stores data to be loaded into the in-memory analytic data store nodes 730. In some implementations, the RDBMS 740 loads data into the in-memory analytic data store nodes 730 in parallel.

Figure 13:
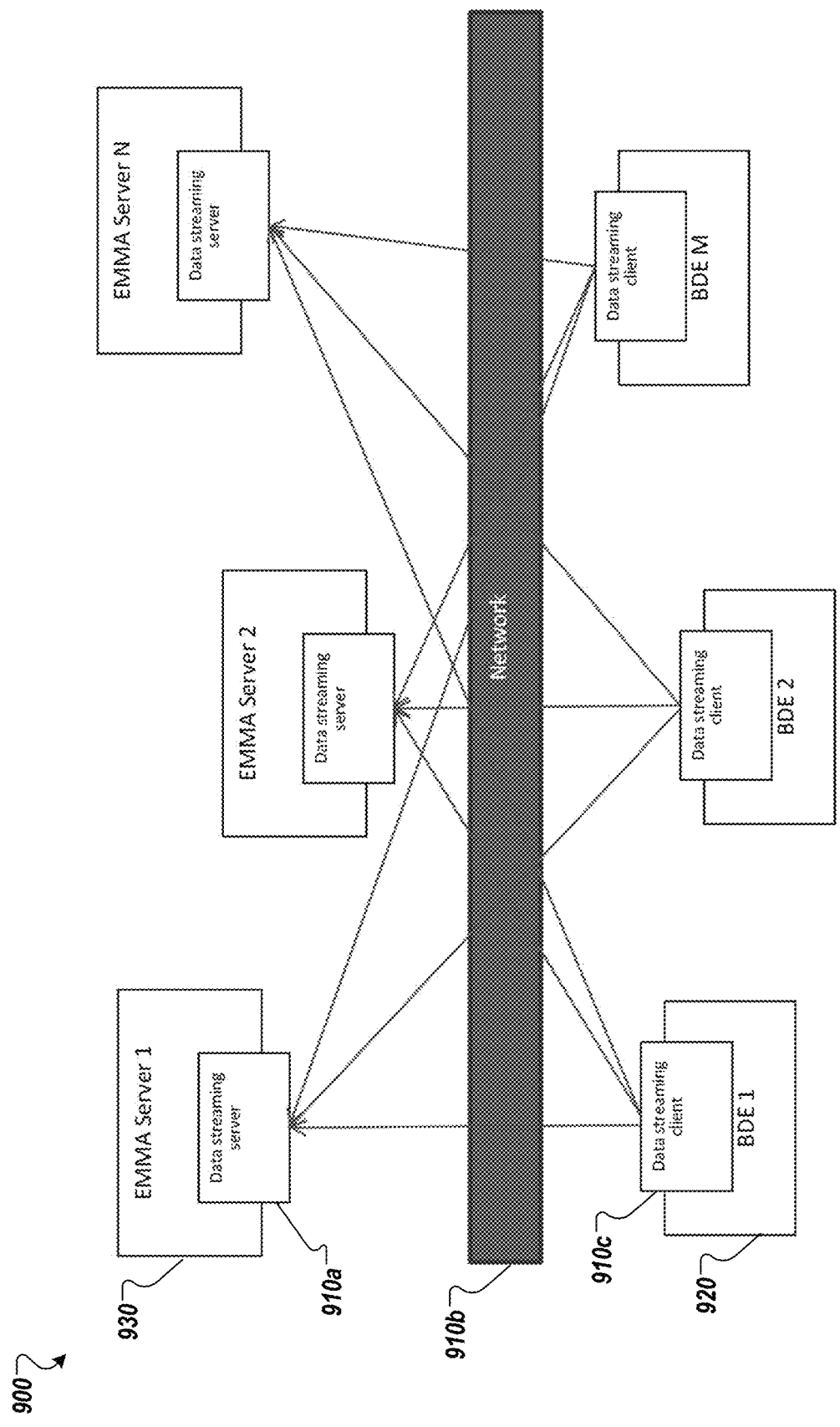
FIG. 13 is a block diagram illustrating an example data streaming architecture.

FIG. 13 is a block diagram illustrating an example data streaming architecture 900. The data streaming layer 910 works as the connector of BDE (Big Data Engine) 920 and in-memory servers 930. It maintains the interface of a Table and its serialization/deserialization over network 910b on different machines and in different languages, and all those intermediate steps between them. In some implementations, the upper layer can just work with Table objects.

There are M data source nodes and N server nodes. After map-reduce, each BDE server 920 generates a table. Then it splits the big table into N tables according to certain partition strategy, and sends each table to its corresponding server. Therefore, each server will receive a table from each BDE server, and assemble them into a larger table that may be in a particular or proprietary format for the upper layer to use. In some implementations, each table sent from each BDE server may be very large. In these implementations, the data streaming component may split it into small sub tables and sent to the destination.

In some implementations, the servers know that each BDE server has finished table transmitting. In these implementations, there is an agreement that each BDE server has to send an empty table to each server to notify it that table data sent to a user is already done. The server can collect M empty tables from M BDE servers, then it knows the data is all transmitted.

Figure 14:
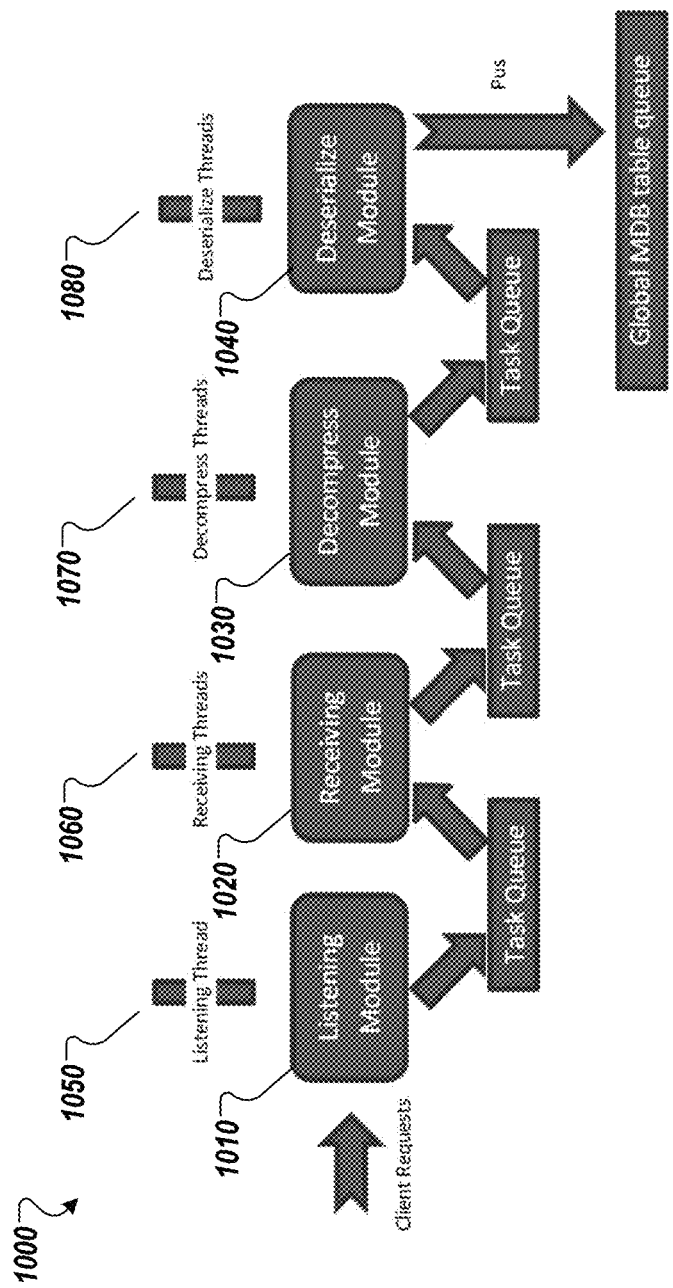
FIG. 14 is a block diagram illustrating an example process for data streaming.

FIG. 14 is a block diagram illustrating an example process 1000 for data streaming. For an online service server, there are usually two basic programming models to choose, one is a multi-threading model while the other is an event based model. The multi-threading model may be more natural for programmers, and may make a programmer focus more on the business logic itself, but may not perform well under high concurrency due to expensive context switch, lock contention, etc. Also, when there is a large amount of requests at the same time, a c10k problem may arise. The event model may not also have the c10k problem. However, the event model may not be as natural for programmers. For example, event based models tend to obfuscate the control flow of the application. Many event systems "call" a method in another module by sending an event and expect a "return" from that method via a similar event mechanism. In order to understand the application, the programmer should match these call/return pairs, even when the call/return pairs are in different parts of the code.

In some implementations, a system may include a combination of the above two modes. In these implementations, the system decomposes a business into several stages, connected with several queues. Inside each stage, there are several work threads, which take the input from the task queue, and write the result into an output queue that may be an input task queue of another stage.

Figure 10:
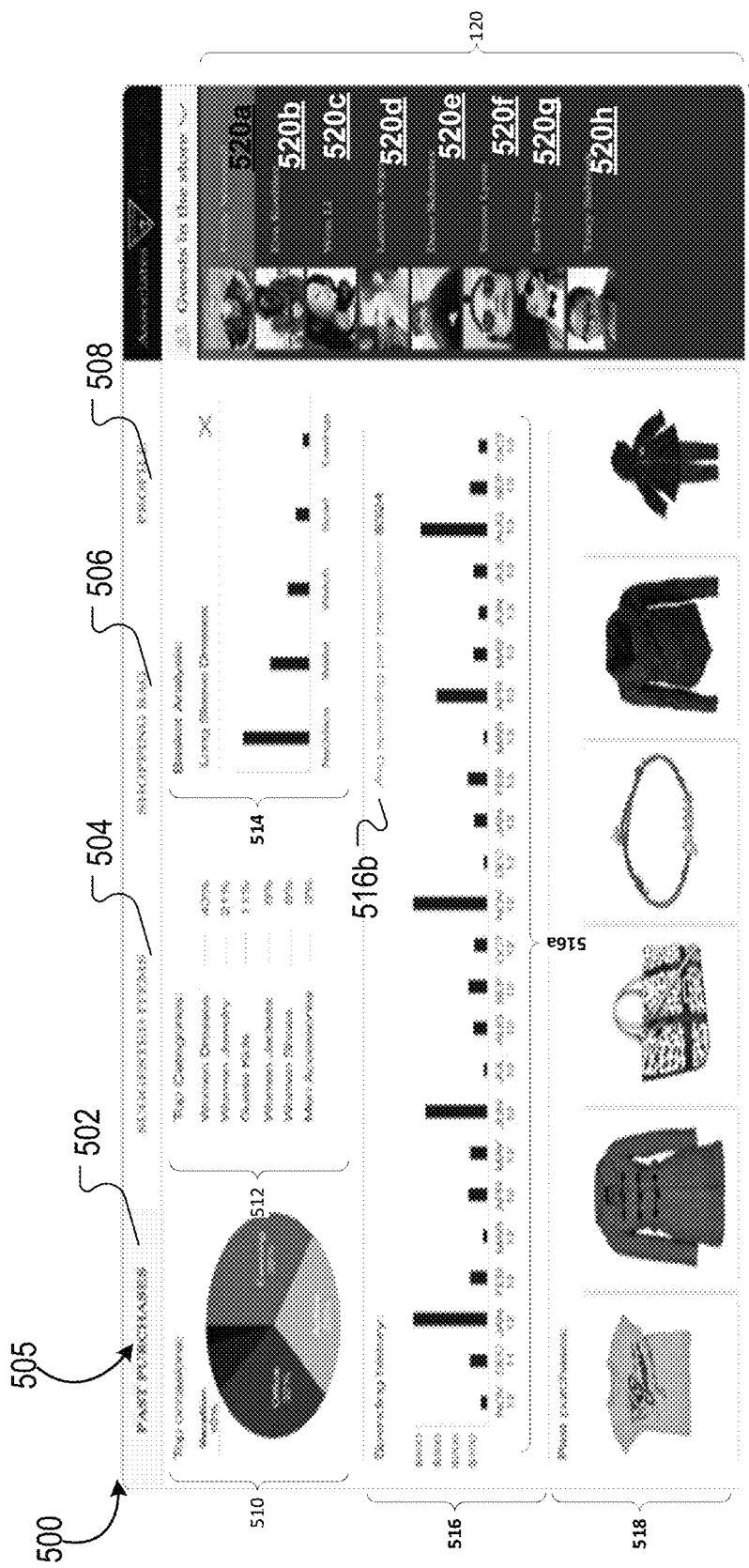

In some implementations, the data streaming server performs a process using four modules, the listening module 1010, the network receiving module 1020, the decompress module 1030, and the deserialize module 1040 as is illustrated in FIG. 10.

The listening module 1010 uses one listening thread that listens on a certain port, accepts client requests, generates internal connections, and pushes into a task queue. The receiving module 1020 uses several receiving threads that are responsible for receiving binary table data from clients and checks whether the data is correct. After the receiving module 1020 receives data, it closes the connection with the client, and pushes raw table data into a task queue.

The decompress module 1030 decompresses raw table data if the raw table data is decompressed. The deserialize module 1040 uses several work threads that help deserialize the binary data into a table that may be in a particular or proprietary format, and push the deserialized data into a global queue, waiting for the upper layer to use the deserialized data.

Decomposing the process into small granular stages allows for flexibility in controlling the system and resources. For example, the thread pool of each module could make adjustments according to the situation of its task queue. In some implementations, work threads poll a task queue to determine if there is a task for the work thread. In some implementations, the system switches to the event model.

There are several types of threads inside the data streaming server. The server includes a listening thread 1050 that on a certain port, accepts connections from clients, and pushes them into task queue. In some implementations, the server includes only one listening thread 1050. The server includes a receiving thread 1060 that receives binary data from a client, and calculates the checksum to make sure the received data is correct. The server includes a decompress thread 1070 that decompresses binary data. The server includes a deserialize thread 1080 that deserializes binary data into tables that are in a particular or proprietary format.

In some implementations, the server includes a monitor thread that runs periodically to determine system CPU and memory usage. In some examples, the server includes a clean thread. The end of table occurs when the server receives an empty sub-table from a data node to indicate that the table from the data node has completed transfer. With the server performing decompression and deserialization in different stages, any previous sub-tables may or may not be already deserialized. Therefore, when the server receives and empty table, the clean thread will put this table on a watch list, and check whether all sub-tables from this data node are already deserialized. If the table is deserialized, then the clean thread pushes it into a global queue for the upper layer to use. If the table is not deserialized, then the clean thread will keep watching until it is deserialized.

In some implementations, the server includes an adaptive thread that checks the task numbers of each queue, and decides whether to start new threads or kill old idle threads. In some examples, the server includes a server loader thread that, when the server shuts down, flushes raw table data, sometimes all raw table data, in memory into disk. Therefore, this thread is responsible for loading the data when the server restarts.

The protocol may be based on TCP channel to improve the correctness of data. There are several interactions between server and clients. At the beginning, when a connection is established, a client waits for an OK command from the server. If there are already too many connections in the server, or system resources are sufficient, then the server sends a BUSY command to the client. When the client receives a BUSY command, the client will retry within a certain time period.

After the client receives an OK command from the server, the client sends a META command to the server. The META command describes some metadata information about a table to be sent, such as table ID, table sequence number, table size, or whether table is compressed or optimized for the network.

After the server receives the META command, the server checks if it can find this table in memory. If the server can find the table, it suggests that the table is somehow not finished transferring data the previous time. The server obtains the confirmed size, and sends an OFFSET command to the client, so the client can resume the last transmission in order to save time. If the server cannot find the table in memory, then the server creates a new table and sends the offset equal to zero.

After the client receives the OFFSET command, the client sends a DATA command together with real table binary data to the server. The server receives the real table binary data, and calculates checksum for this binary. If the checksum matches with the one sent by client, then the server sends an OK command to client. If the checksum does not match, then the server sends an ERROR command with a corresponding error code and requests that the client re-send.

The server utilizes several commands. Each command has a four byte header to indicate its type. Different commands may have different parameters.

The OK command includes a header "OKOK" and no parameters. The BUSY command includes a "BUSY" and no parameters. The META command includes a "META" header and the parameters table name (String), table size (int), table sequence number (int), compressed (bool), and opt4network (bool). The OFFSET command includes the header "OFFS" and the parameters offset (int). The DATA command includes the header "DATA" and the parameters table binary data (binary) and checksum (binary). The ERROR command includes the header "EROR" and the parameters error code (int).

The server includes a configuration file that may be passed as a parameter for the server to initialize its default setting. The format of the configuration file is as follows.

```
{
  "http" :
  {
    "port": 12345
  },
  "thread" :
  {
    "receiverThreadNum": 5,
    "receiverThreadMaxNum": 10,
    "deCompressThreadNum": 3,
    "deCompressThreadMaxNum": 10,
    "deSerializeThreadNum": 5,
    "deSerializeThreadMaxNum": 8,
    "monitorThread": true,
    "adaptiveThread": true,
    "loadPreviousTables": true
  },
  "datasource" : [
    {
      "ID": "10.197.62.100"
    }
  ]
}
```

The data source section specifies the data source identification. In some implementations, the server uses IP.

The server implements an adaptive thread control. For the control strategy, if any waiting task numbers in the queue are greater than a particular number, for example, one hundred, then the process will spawn another corresponding worker thread up to the max thread number specified in the configuration file. If the waiting task numbers in the queue are less than another particular number, for example, ten, then the process kills any temp idle worker thread.

When the server shuts down, the server saves state. The server loads the state when starting. When the data streaming server shuts down, if there are still some raw tables waiting to be decompressed or deserialized, or some tables waiting to be completed, for example, waiting for a table from another data source node, the server will flush them into disk. By default, the server may save to a BIN/DataStream folder. When the server restarts, the server will spawn a loader thread to load the contents of the folder into memory.

In some implementations, the Global table queue may be used as unstructured or semi-structured data in the process described with respect to FIG. 1. In these implementations, the Global table queue may be integrated with structured data and results to queries may include a combination of structured data and unstructured or semi-structured data. In this regard, the streaming data may be treated in a similar manner to a search index and the streaming data (e.g., data from a social media source) may be accounted for and integrated with structured data in query results.

Figure 15:
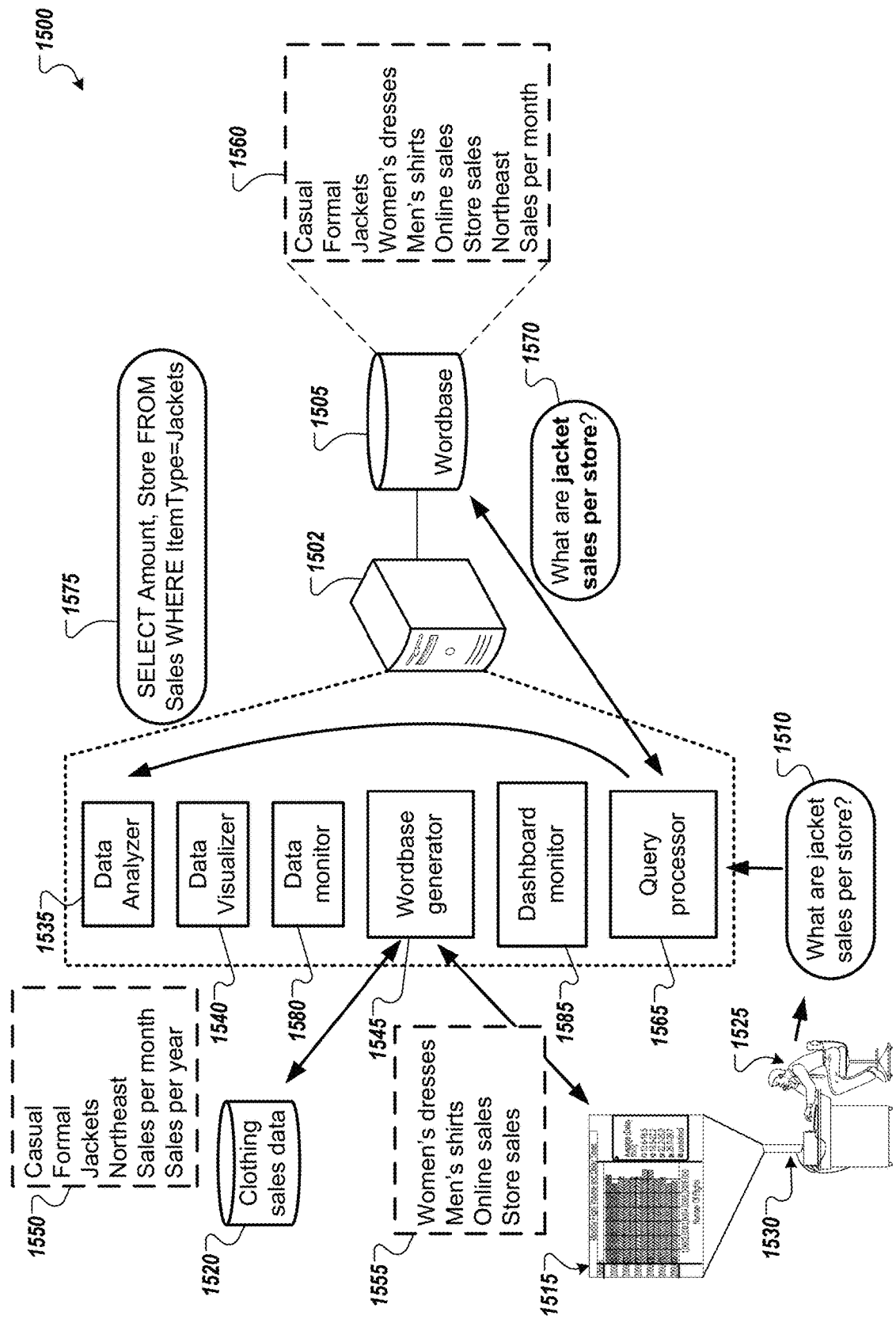
FIG. 15 illustrates an example system that uses a wordbase to process a query.

FIG. 15 illustrates an example system 1500 that uses a wordbase 1505 to process a query 1510. The wordbase 1505 can be used to customize and direct the processing of the query 1510 based on the documents, data, and applications currently in use at a computer system. Briefly, and as described in more detail below, the system 1500 can use context information, such as content of an open document and data sources associated with the document, to improve the quality of search results for queries. The system 1500 can use the context information to generate the wordbase 1505, which can be a collection of words and other terms that are contextually relevant to an open document or other content associated with the current context of a user. This wordbase 1505 can be customized for the current document or interface of a computer system, and can be dynamically updated in substantially real time to indicate the current context on an ongoing basis. The system 1500 can use the wordbase 1505 to interpret the query 1510, to generate autocompletions that extend or correct the query 1510, and to generate recommended queries. In this manner, the way the system 1500 processes queries can be dynamically tailored for the on-screen context and data context the user is working in when the query 1510 is entered. In general, the content of the wordbase 1505 can be used to enhance many different aspects of query processing, including query interpretation, result selection, result ranking, query autocompletion, and query recommendation.

The content used to generate the wordbase 1505 can include more than simply the content of a document being viewed or the set of words on screen. For example, the system 1500 can additionally consider the content and metadata of data sources that are referenced by a document or user interface. If a client device shows a chart, graph, or other visualization, the system 1500 can extract words and phrases from data records, tables, or other underlying data sources used to generate the visualization and add the extracted words and phrases to the wordbase 1505.

In the example of FIG. 15, the data processing system 1502 generates a visualization 1515 of data set 1520. The data processing system 1502 generates the wordbase 1505 by analyzing the visualization 1515 and the underlying data set 1520. The user 1525 interacts with the visualization 1515 and submits the query 1510. The data processing system 1502 interprets the query 1510 using the wordbase 1505 and updates the visualization 1515.

The data processing system 1502 may be one or more computing devices that is configured to analyze the data set 1520. The data set 1520 may be structured data or unstructured data or a combination of both. For example, the data set 1520 may include a database of sales data for each store. The data set 1520 may also include receipts from each store. The receipts may include an itemized list of items sold in each transaction or may include the total amount of the transaction. The data set 1520 may include additional documents and may be updates as additional transactions occur and/or as the sales database is updated.

The user 1525 is accessing the data processing system 1502 through the client device 1530. The client device 1530 may be any type of computing device that is configured to interface with the data processing system 1502. The client device 1530 may be a tablet, smart phone, laptop computer, desktop computer, or any other similar computing device. The techniques for enhanced query processing can be used to take into account any of various tasks or use cases of the client device 1530. For example, the enhanced query processing may use context of an open document being viewed, a document being created or edited, a task in progress, an application that is active or open, the visualization 1515, and so on. The user 1525 may design a new visualization 1515 for the data set 1520 or open a previously created visualization 1515. The visualization 1515 may include various charts and graphs that represent the data set 1520.

To generate the visualization 1515, the data processing system 1502 includes a data analyzer 1535 and a data visualizer 1540. The data analyzer 1535 may be configured to perform various analytic processes on the data set 1520. The data analyzer 1535 may search the data set 1520 for specific data that is related to a user request. For example, the user 1525 may request a graph that includes sales for each store for the previous year. The data analyzer 1535 may search the data set 1520 for data related to the sales for each store. The data analyzer 1535 may total all the transactions for each store to generate multiple sales totals.

The data visualizer 1540 may receive data from the data analyzer 1535 and generate a graph or other type of visualization 1515 to present to the user 1525. The visualization may be any appropriate type for the contents of the data set 1520, e.g., a bar chart, a pie chart, a line graph, a scatterplot, a heat map, a geographical map, etc. For example, the visualization 1515 may include a bar graph that indicates each store on the x-axis and the total amount of sales on the y-axis. The user 1525 may be able to add additional graphs to the visualization 1515, filter the visualization 1515, and/or update the visualization 1515.

The data processing system 1502 also include a wordbase generator 1545 that is configured to select words and other terms to be included in a wordbase 1505. The wordbase 1505 is a collection of words and other terms that are determined by the data processing system 1502 to be contextually relevant to the visualization 1515 and the data set 1520. The wordbase generator 1545 analyzes the data set 1520 to determine contextually relevant words. The wordbase generator 1545 may identify words that are fields of databases, that are labels for columns and rows of spreadsheets, that are document filenames, and/or any other words or terms that are contextually relevant to the data set 1520. For example, the wordbase generator 1545 may identify terms 1550 that include casual, formal, jackets, northeast, sales per month, and sales per year by analyzing the data set 1520.

The wordbase generator 1545 also analyzes the visualization 1515 to identify words that are contextually relevant to the visualization 1515. The wordbase generator 1515 may identify terms that are labels for different axes in the various graphs in the visualization 1515. The wordbase generator 1515 may also identify terms that are included in legends in the visualization 1515. For example, the wordbase generator 1515 may identify terms 1555 that include women's dresses, men's shirts, online sales, and store sales. When the visualization 1515 is part of another document or interface, the wordbase generator 1545 can also identify terms occurring in the document or interface and in data sets referenced by other parts of the document or interface as being relevant.

The wordbase generator 1545 stores the terms 1550 and the terms 1555 in the wordbase 1505. For example, the terms 1560 in the wordbase 1505 include a combination of the terms 1550 and the terms 1555. With the wordbase 1505 populated, the data processing system 1502 may use the wordbase 1505 to perform various types of query processing, e.g., to interpret queries received from the user 1525, to generate autocompletions for queries, to select results for queries, to rank results for queries, and to recommend additional queries.

The wordbase generator 1545 may update the wordbase 1505 when the data set 1520 changes and/or when the visualization 1515 changes (e.g., when the visualization 1515 is edited by the user 1525). In this manner, the wordbase 1505 can be maintained to represent a current set of contextually relevant terms before the user enters a new query, even as the context is changing.

One way that the data processing system 1502 can use the wordbase 1505 to enhance query processing is in the generation of query autocompletions. In the example illustrated in FIG. 1, the user 1525 submits the query 1510 while viewing the visualization 1515, e.g., while the visualization 1515 is open or presented on the screen of the device 1530. The query processor 1565 may use the wordbase 1505 to generate autocomplete suggestions as the user 1525 enters the query 1510. For example, the user may be typing "what are j," and the query processor 1565 may determine that the term "jackets" is in the terms 1560 of the wordbase 1505. The query processor 1565 may provide the autocomplete suggestion of "what are jackets." In some instances, the query processor 1565 may provide autocomplete suggestions if there are less than a threshold number of words or terms that match what the user entering. For example, the wordbase terms 1560 may include over one hundred terms that begin with the letter "t." If the user enters the letter "t," then the query processor 1565 may not suggest each of the terms that start with "t." If the user enters the letters "ter" and there are three terms or words in the wordbase 1505 that begin with "ter," then the query processor 1565 may provide autocomplete suggestions using those terms. The threshold number of words may be set by the system or may be defined by the user 1525. The terms 1560 in the wordbase 1505 may be combined with other information, such as statistics or logs of prior queries by the user 1525 or other users. For example, matches between the terms 1560 with prior queries can be used to select or rank the prior queries as potential autocompletions for the current query 1510. For example, a set of prior queries may be filtered to a subset that have a match to one or more of the terms 1560, and query autocompletions can be based on the prior queries in the subset.

Another way that the data processing system 1502 can use the wordbase 1505 to enhance query processing is in interpreting the query 1510. The user 1525 completes the query 1510 and submits the query 1510 to the data processing system 1502 through the client device 1530. The query processor 1565 uses natural language processing and the wordbase 1505 to interpret the query 1510. Query terms that match the terms 1560 can be identified as having increase importance or weight in processing the query. In addition, phrases in the query that are also phrases in the wordbase 1505, can be grouped as a unit and not divided. Matches between the query terms and the wordbase 1505 can also be used to interpret the semantic meaning or intent of certain query terms, such as the user's desired role of a word or phrase in the query or in output results. For example, matches to terms "jacket" and "store" can indicate which data should be on the x axis and y axis of a visualization responsive to the query. To perform natural language processing, the query processor 1565 may analyze the query 1510 to identify aggregation symbols, condition symbols, and sorting symbols. An aggregation symbol may include terms related to numbers such as "count of" and "max." The query processor 1565 may be able to generate a metric based on the aggregation symbol. A condition symbol may include terms related to relationships such as "greater than." The query processor 1565 may analyze the query 1510 for conditional symbols and creates a view filter to fulfill the user's request. A sorting symbol may include terms related to filtering and sorting such as "sorted by." The query processor 1565 may apply sorting based on the identified sorting symbols.

The query processor 1565 may also use the wordbase 1505 to identify dataset objects that may be relevant to process the query 1510. In some instances, the wordbase 1505 may indicate which objects in the data set 1520 each word or term corresponds to. An object may include a document, database, spreadsheet, file, or any other type of object included in the data set 1520. For example, the wordbase generator 1545 may identify the word "casual" from a document that lists the different categories of clothing offered by the stores. The wordbase generator 1545 may then link that document to the word "casual." Some words may have more than one related document. Some documents may have more than one related word in the wordbase 1505.

In the example in FIG. 1, the query processor 1565 may identify objects related to the term "jacket" and provide those objects or data identifying those objects to the data analyzer 1535.

The query processor 1565 may identify key terms in the query 1510 by using natural language processing, the wordbase 1505, and identifying aggregation symbols, condition symbols, and sorting symbols. The query processor 1565 may identify the key terms "jacket sales per store" as illustrated in query 1570. The query processor 1565 provides a formatted query 1575 such as an SQL query to the data analyzer 1535. The data analyzer 1535 analyzes the data set 1520 included any objects identified by the query processor 1565 based on the query 1575. The data analyzer 1535 provides the analyzed data to the data visualizer 1540. The data visualizer 1540 updates the visualization 1515 by revising a currently presented chart or graph or adding a new graph or chart. As an example, the data processing system 1502 can use matches between query terms and terms 1560 in the wordbase 1505 to translate from natural language elements to data set elements corresponding to the terms 1560. The words in the wordbase 1505 can be associated with metadata that indicates the objects, fields, columns, tables, or other items from which the words were extracted. Given a match between a query term and a field value for a data table, for example, the data processing system 1502 can recognize the query term as a reference to the data in the field. For example, the query term "jacket" can be determined to be a match for the term 1550 "Jackets" found in the data set 1520 as a value in a column labeled "ItemType." As a result, the query term can be represented in a structured query as a limitation "WHERE ItemType=Jackets."

In some instances and after the query processor 1565 parses the query 1510, the query processor 1565, the data analyzer 1535, and/or the data visualizer 1540 selects a type of visualization that best suits the query. The logic used to select a visualization may be an experience system that selects the visualization based on the dataset object type, user input, number of dataset objects, or any other similar data. The dataset object may be a geographical attribute or a time attribute. The user input may be the user specifying a particular visualization type. The experience system may decide which dropzone each dataset object should be added to. The dropzone may identify a portion of the display of the client device 1530.

The data processing system 1502 can refresh the set of terms 1560 in the wordbase 1505 periodically or in response to changes in the current data context. The data processing system 1502 also include a data monitor 1580 and a dashboard monitor 1585. The dashboard monitor 1585 is configured to monitor the visualization 1515 for any changes. The data monitor 1580 is configured to monitor the data set 1520 for any changes. The dashboard monitor 1585 may identify changes such as a new filter added to the visualization 1515, a new graph or chart added to the visualization 1515, or any other similar changes. If the dashboard monitor 1585 identifies a change to the visualization 1515, the dashboard monitor 1585 instructs the wordbase generator 1545 to analyze the changes to the visualization 1515 and identify any additional words for the wordbase 1505. In some instances, the change may result in the removal of words from the wordbase 1505. For example, the user 1525 may remove a graph from the visualization 1515. The graph may be related to the words jackets and pants. In this case, the wordbase generator 1545 may remove those words from the wordbase 1505. In some instances, the change may result in the addition of words to the wordbase 1505. For example, the user may add an additional line to a graph that relates to show sales per store. In this case, the wordbase generator 1545 may add the word shoes to the wordbase 1505.

The data monitor 1580 may identify changes in the data set 1520. For example, the data monitor 1580 may determine that a change has occurred in a database or that a new file was added to the data set 1520. The data monitor 1580 may instruct the wordbase generator 1545 to analyze the new file or data added to the data set 1520. For example, the new data may be a spreadsheet related to the latest quarter sales. The new spreadsheet may not be related to any additional words not in the wordbase 1505 already. In this instance, the wordbase generator 1545 does not make any changes to the wordbase 1505. The data processing system 1502 may use the updated wordbase 1505 to interpret any additional queries received from the user 1525.

Another way that the data processing system 1502 can use the wordbase 1505 is in selecting and ranking search results. When processing the query 1510, the set of results identified can be selected or ranked at least in part based on whether the results include terms 1560 of the wordbase 1505. For example, the presence of a term 1560 can increase an information retrieval score for a document or other content retrieved responsive to the query 1510. Results can then be ranked based on the information retrieval scores.

In addition, the terms 1560 in the wordbase 1505 can be used to generate recommended queries. For example, prior queries that have been submitted by the user 1525 or other users can be used as candidate queries, and the candidate queries can be ranked or filtered based on whether the candidate queries match to one or more of the terms 1560.

In some implementations, the terms 1560 may be associated with different scores that indicate differences in relevance or importance. For example, each term 1560 may have a weighting value assigned based on one or more factors such as the frequency of occurrence of the term in the context, a distinctiveness of the term (e.g., an inverse of how common the term is generally), a proximity of the term to content that a user is currently interactive with (e.g., on the same page, or on an adjacent page, or many pages away), the source of the term (e.g., from currently viewed content or from a data source referenced by the content), and so on. In some implementations, multiple wordbases may be generated, for example, one for terms 1555 and another for terms 1550, and the wordbases may have differing levels of influence on query processing.

Figure 16A:
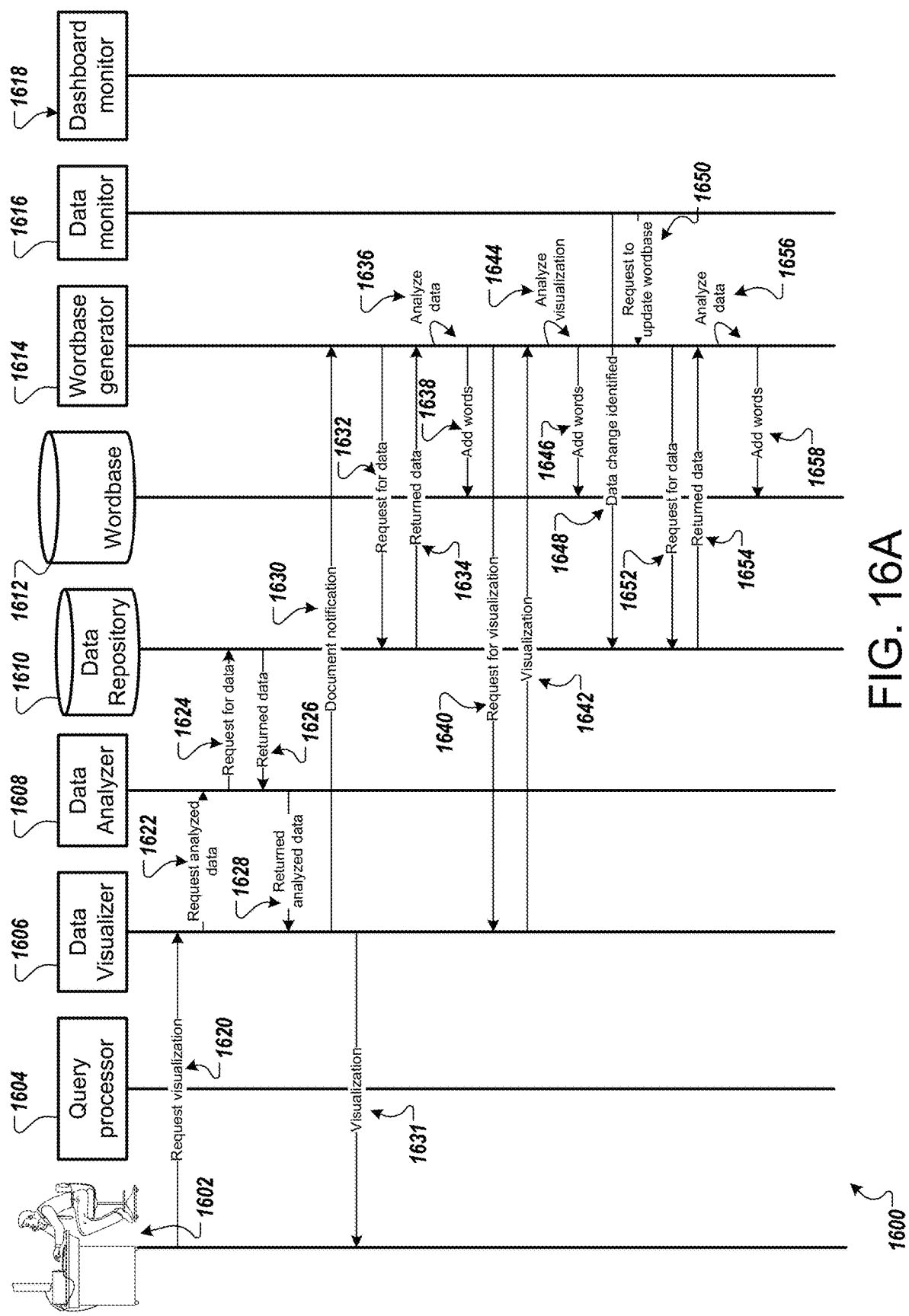
FIGS. 16A-16C are swimlane diagrams that illustrate the data exchanges between the components of a data processing system.
Figure 16B:
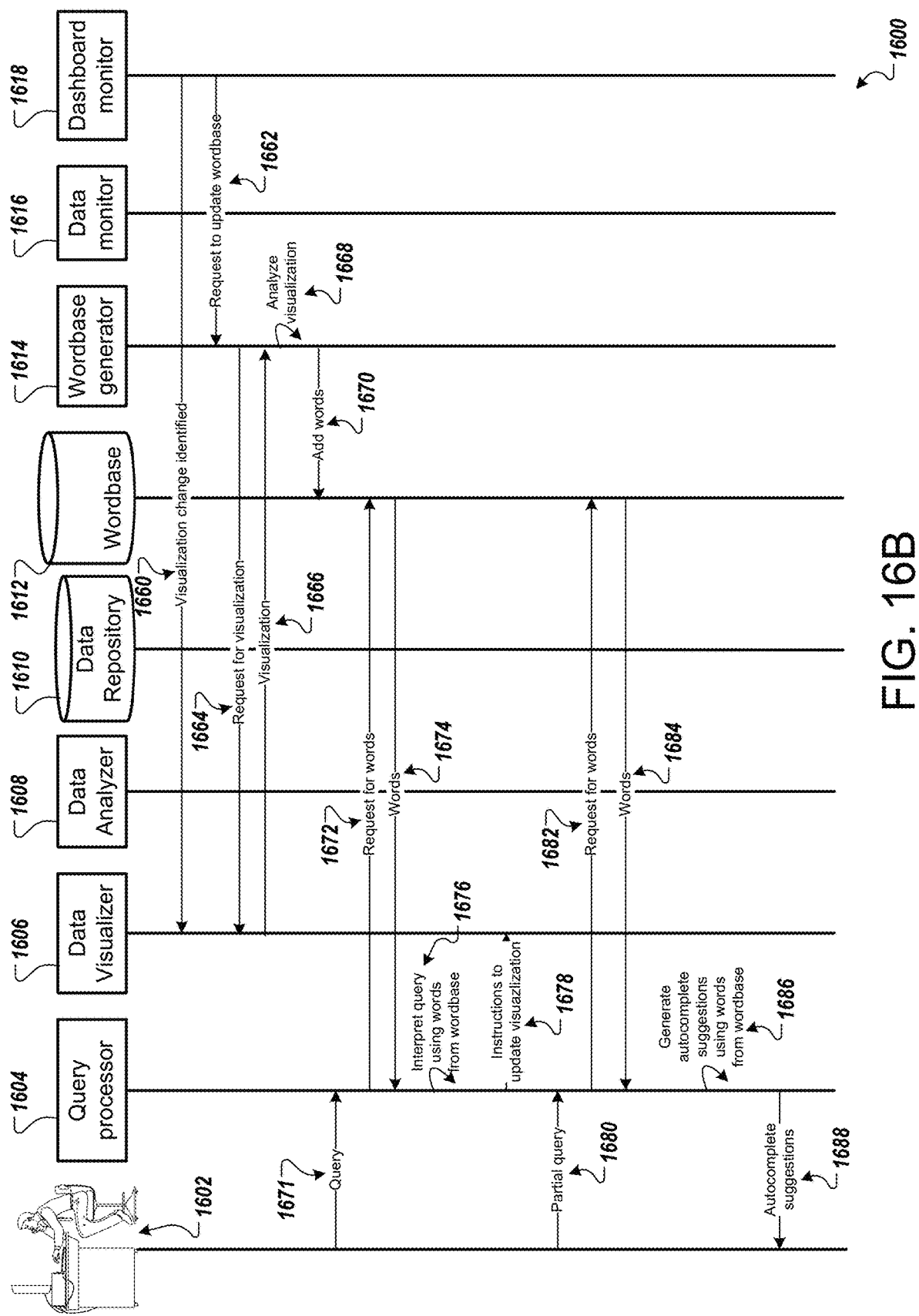
Figure 16C:
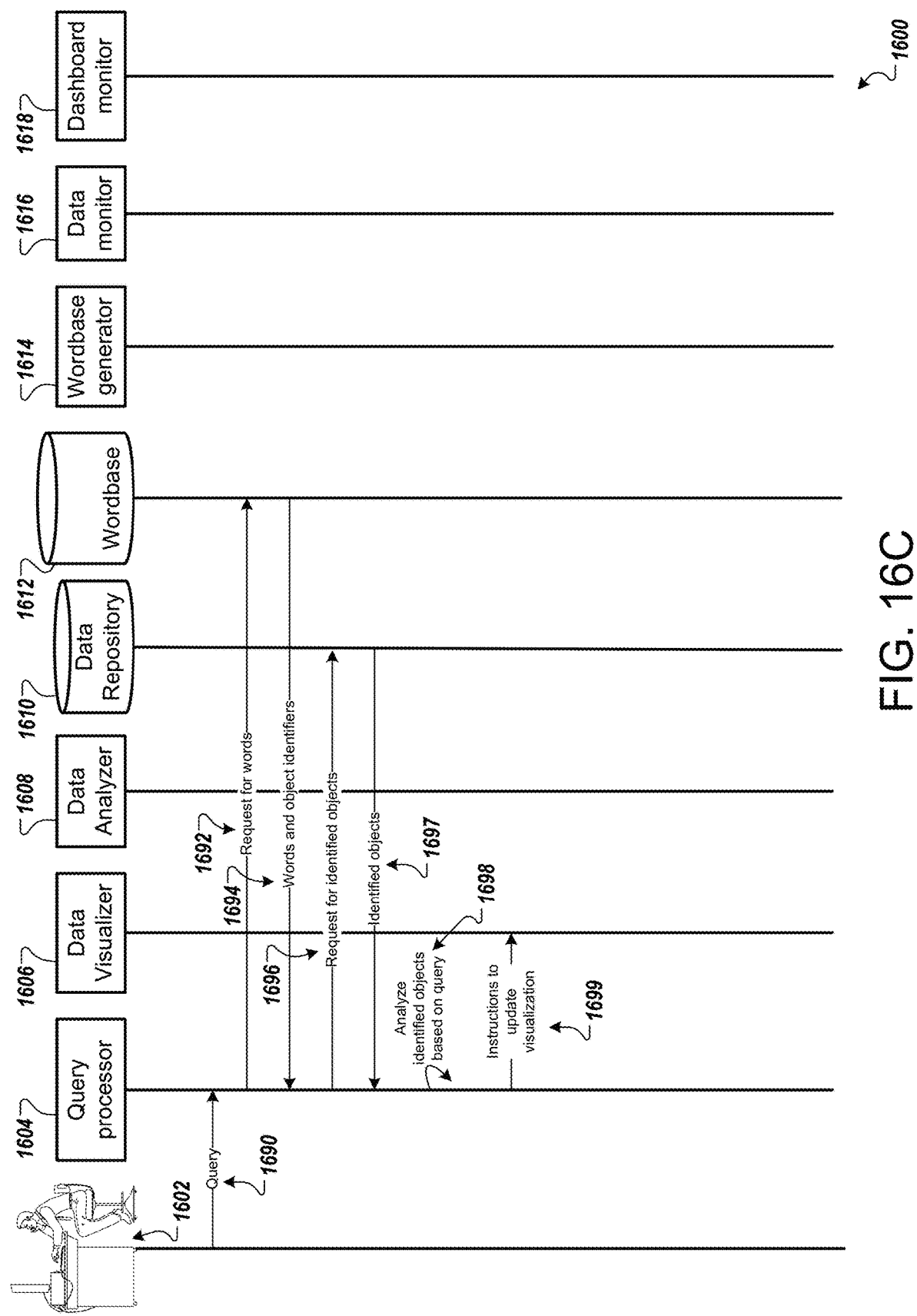

FIGS. 16A-16C are swimlane diagrams that illustrate the data exchanges between the components of a data processing system 1600. The data processing system 1600 includes components similar to the system 1500 of FIG. 15 such as the query processor 1604, the data visualizer 1606, the data analyzer 1608, the clothing data repository 1610, the wordbase 1612, the wordbase generator 1614, the data monitor 1616, and the dashboard monitor 1618. The data flow illustrated in FIGS. 6A-16C may occur in a different order than illustrated.

In stage 1620, the user 1602 submits a request for a visualization. This visualization may be one that the user 1602 previously created or that another user previously created. In some instances, the user 1602 may submit a request in the form of a query and the data processing system 1600 generates the visualization base on the query. The data visualizer 1606 receives the query or the request for the visualization. Based on the request the data visualization, the data visualizer 1606 transmits a request for analyzed data to the data analyzer 1608 in stage 1622. For example, the visualization request 1620 may be a query to for the first quarter sales by clothing type. The data visualizer 1606 may send a request for data related to sales by clothing type for the first quarter. In stage 1624, the data analyzer 1608 accesses the data related to the request from the data repository 1610. In stage 1626, the data analyzer 1608 receives the data from the data repository 1610. The data analyzer 1608 performs various analytics on the data received in stage 1626. In stage 1628, the data analyzer 1608 provides the analyzed data 1628 to the data visualizer 1606. The data visualizer 1606 generates a visualization of the analyzed data. For example, the data visualizer 1606 generates a bar graph that includes different clothing types on the x-axis and the first quarter sales on the y-axis. In stage 1631, the data visualizer 1606 provides visualization to the user 1602.

In some instances and in stage 1630, once the user 1602 is accessing the data processing system 1600, the wordbase generator 1614 may receive an indication from the data visualizer 1630 that the user 1602 is viewing a visualization 1631. The wordbase generator 1614 builds the wordbase 1612 by accessing the data repository 1610 and the visualization from the data visualizer 1606. In some instances, the wordbase generator 1614 may generate the wordbase 1612 by accessing the data repository 1610 before the user 1602 requests a visualization or submits a query. This way the data processing system 1600 can use the wordbase to interpret any initial queries received from the user 1602.

In stage 1632, the wordbase generator 1614 requests data from the data repository 1610. In stage 1634, the wordbase generator 1614 receives the data from the data repository 1610. In stage the 1636, the wordbase generator 1614 analyzes the returned sales data to identify words for the wordbase 1612. In stage 1638, the wordbase generator adds those words to the wordbase 1612.

In stage 1640, the wordbase generator 1614 requests the visualization from the data visualizer 1606. In stage 1642, the wordbase generator 1614 receives the visualization from the data visualizer 1606. In stage 1644, the wordbase generator 1614 analyzes the visualization and identifies the words for the wordbase 1612. In stage 1646, the wordbase generator 1614 adds those words to the wordbase 1612.

The data monitor 1616 and the dashboard monitor 1618 are configured to monitor the data repository 1610 and the visualization, respectively, for changes. If a change is detected, then the wordbase generator 1614 receives a notification indicating that the wordbase generator 1614 should analyze the visualization or the data repository 1610 to determine if changes should be made to the wordbase 1612.

In stage 1648, the data monitor 1616 determines that the data repository 1610 has changed. The change may be a new file that was added to the data repository 1610, the contents of an existing file changed, or a file was removed. In stage 1650, the data monitor 1616 instructs the wordbase generator 1614 to analyze the data repository 1610 to determine if the wordbase 1612 should change. In stage 1652, the wordbase generator 1652 requests the data from the data repository 1610. The data monitor 1616 may indicate to the wordbase generator 1614 which part of the data repository 1610 changed. In this instance, the wordbase generator 1614 may only request the changed data. In stage 1654, the wordbase generator 1614 receives the data. The wordbase generator 1614 analyzes the data in stage 1656, and adds any new words to the word base in stage 1658. In some instances, the data monitor 1616 may determine that data has been removed from the data repository 1610. In this instance, the data monitor 1616 may provide that data to the wordbase generator 1614. The wordbase generator 1614 may identify the words from the removed data. The wordbase generator 1614 may remove those words from the wordbase 1612. In some instances, the wordbase generator 1614 may analyze the data repository 1610 to determine the words marked for removal are not relevant to the data that remains in the data repository 1610.

In stage 1660, the dashboard monitor 1618 determines that the visualization has changed. The change may be a new graph that was added to the visualization or a new filter applied to a graph on the visualization. The dashboard monitor 1618 instructs the wordbase generator 1614 to analyze the visualization to determine whether any words should be added or removed from the wordbase 1612. In stage 1664, the wordbase generator 1614 requests the visualization from the data visualizer 1606. In stage 1666, the wordbase generator 1614 receives the visualization. The wordbase generator 1614 analyzes the visualization in stage 1668 and determines whether any changes should be made to the wordbase 1612. In stage 1670, the wordbase generator 1614 adds words to the wordbase 1612.

In some instances, the change may be based on changes in the data repository 1610. In this case, the data monitor 1616 may identify the change in the data repository 1610, and the dashboard monitor 1618 may identify the change in the visualization. The data monitor 1616 and the dashboard monitor 1618 may instruct the wordbase generator 1614 to update the wordbase 1612 at the same time or within a threshold time period of each other. In this case, the wordbase generator 1614 may only analyze the updated data repository 1610 instead of analyzing both the data repository 1610 and the visualization.

In some instances, the wordbase generator 1614 may identify an object in the data repository 1610 from which the wordbase generator 1614 identified the word. In this case, the wordbase generator 1614 may include an identifier with the word in the wordbase 1612 that identifies the object. For example, the wordbase generator 1614 may identify the word "suit" from a database in the data repository 1610. The wordbase generator 1614 may store "suit" and an identifier for the database in the wordbase 1612.

The wordbase generator 1614 may also identify objects in the visualization from which the wordbase generator 1614 identified the word. In this case, the wordbase generator 1614 may include an identifier with the word in the wordbase 1612 that identifies the object of the visualization. For example, the wordbase generator 1614 may identify the term "first quarter" from a graph in the visualization. The wordbase generator 1614 may store "first quarter" and an identifier for the graph in the wordbase 1612.

In some instances, the wordbase generator 1614 may associate more than one object with a single word or term. For example, the word "jacket" may be associated with the database in the data repository 1610, a spreadsheet in the data repository 1610, and a graph in the visualization. In this case, the wordbase generator 1614 may include identifiers for the database, the spreadsheet, and the graph with the word "jacket" in the wordbase 1612.

In some implementations, the wordbase generator 1614 may not remove a word from the wordbase if the word identified for removal remains associated with an object that remains in the data repository 1610 or the visualization. For example, the wordbase generator 1614 may determine that an invoice related to the term "jacket" has been removed from the data repository 1610. The term "jacket" may also be associated with the data repository 1610 and a graph on the visualization. Because the term "jacket" is still associated with some objects that remain, the wordbase generator 1614 does not remove "jacket" from the visualization.

In stage 1671, the query processor 1604 receives a query entered by the user 1602. The query may be related to the visualization, such as a request to filter data shown on a graph, or a request for a new graph to include in the visualization. The query processor 1604 receives the query and access the wordbase 1612 to interpret the query. In stage 1672, the query processor 1604 requests words from the wordbase 1612. In stage 1674, the query processor 1604 receives the words the wordbase 1612. In some implementations, the query processor 1604 may compare the terms in the query to the terms in the wordbase 1612. For example, the query may be "what are jacket sales per store." The query processor 1604 may search the wordbase for each word or term in the query instead of the wordbase 1612 providing the list of words in the wordbase 1612 to the query processor 1604. In stage 1676, the query processor 1604 interprets the query using the words from the wordbase 1612. The query processor 1604 may interpret the query using the words from the wordbase 1612 by identifying keywords in the query and instructing the data analyzer 1608 to analyze data related to those words and/or instructing the data visualizer 1606 to update the part of the visualization related to those words or add a new visualization related to those words. The query processor 1604 provides instructions to data visualizer 1606 to update the visualization in stage 1678.

In stage 1680, the user 1602 begins entering a query. The query processor 1604 access words from the wordbase 1612 in stages 1682 and 1684. The query processor 1686 generates autocomplete suggestions using the words from the wordbase 1612. The autocomplete suggestions may be based on the letters that he user 1602 has already typed. For example, if the user has typed "s," then the query processor 1686 may identify the terms in the wordbase 1612 that begin with "s" such as "shirts" and "skirts." The query processor may provide "shirts" and "skirts" as autocomplete suggestions for "s."

Stage 1686, may involve the query processor 1604 determining whether to provide autocomplete suggestions in stage 1688. The query processor 1604 may not provide auto complete suggestions if the number of potential words in the wordbase 1612 is greater than threshold number. For example, if the threshold number if five, the query processor 1604 may not provide autocomplete suggestions if the query processor 1604 identifies seven possible words. If the query processor 1604 identifies four, then the query processor 1604 may provide the autocomplete suggestions in a drop down menu.

In stage 1690, the query processor 1604 receives a query entered by the user 1602. In stage 1692, the query processor 1604 determines whether there are any words in the query that are included in the wordbase 1612. For the words in the query that are also included in the wordbase 1612, the wordbase 1612 provides object identifiers for each word in stage 1694. The object identifiers may identify different objects that are included in the data repository 1610 and/or the visualization. In stages 1694 and 1696, the query processor 1604 requests and receives the objects related to the object identifiers. In stage 1698, the query processor 1604 analyzes the objects according to the instructions in the query. In stage 1699, the query processor 1604 provides instructions to the data visualizer 1606 for updating the visualization.

In some implementations, the query processor 1604 provides the objects and/or the object identifiers to the data analyzer 1608 and/or the data visualizer 1606. The data analyzer 1608 and/or the data visualizer 1606 analyzes the objects based on instructions from the query processor 1604. The data visualizer 1606 then updates the visualization.

Figure 17:
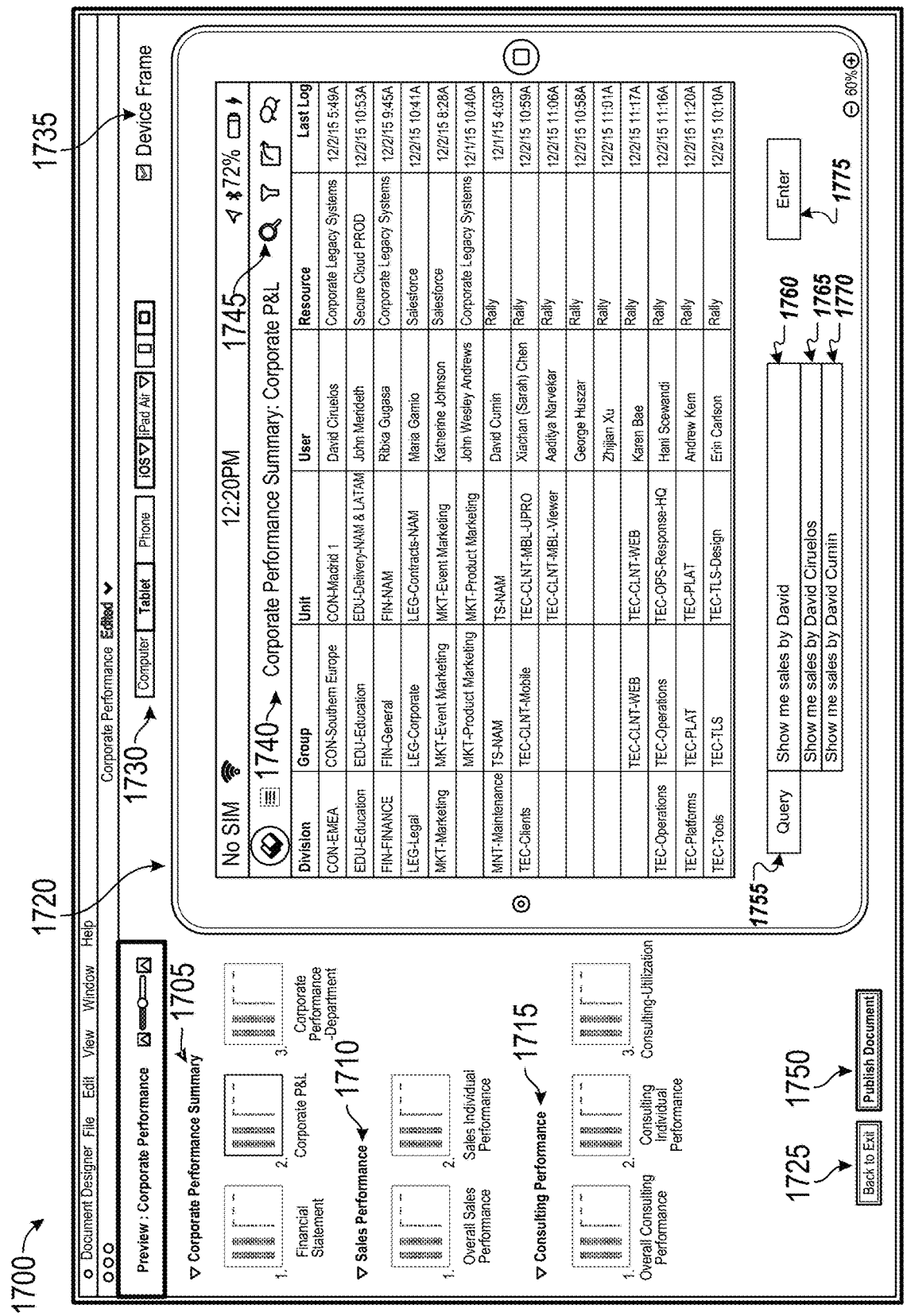
FIG. 17 illustrates an example visualization creation interface.

FIG. 17 illustrates an example visualization creation interface 1700. The visualization creation interface 1700 allows a user to assemble documents and dashboards for a visualization to share with other users. The visualization creation interface 1700 allows the creating user to mimic the viewing experience of users on different devices includes a collection of documents that are assembled by a user.

As shown in the visualization creation interface 1700, the creating user has compiled dashboards and documents into different chapters 1705, 1710, and 1715. The created user has entitled the dashboard 1720 "Corporate Performance." Chapter 1705 is related to corporate performance summary and includes three documents. Chapter 1710 is related to sales performance and includes two documents. Chapter 1715 is related to consulting performance and includes three documents. At any time during the creating of the visualization 1720, the creating user may select button 1725 to return to the dashboard and document creation interface to edit any to the documents in the chapters.

The visualization creation interface 1700 provides options 1730 for the user to visualize the viewing experience of any users who view the visualization 1720. The options 1730 allow the user to select the device, model, and operating system on which the user views the visualization 1720. As shows the visualization creation interface 1700, the creating user selected to visualize the experience of a user viewing the visualization 1720 on an iPad Air tablet running iOS with a landscape orientation. The user may also select option 1735 to visualize a frame of the selected device or only the screen of the selected device.

The visualization 1720 displays the viewing experience of the user with whom the creating user shares the visualization. The visualization 1720 includes a title 1740 that indicates the title of the visualization, the chapter, and the document. The visualization 1720 also includes tools 1745 that allow the user to interact with the visualization other than viewing the visualization 1720. For example, the tools 1745 allow the user to zoom in on the data, filter the data, comment on the data, or share the data or visualization 1720 with other users. Once the creating user has finished with the visualization, the creating user may select the publish button 1750 to publish and share the visualization.

The visualization creation interface 1700 also include a query box 1755 (e.g., a query entry field) where the user can enter a query 1760 to create a new dashboard or visualization to add. A query analyzer may receive queries from the query box 1755 and provide autocomplete suggestions 1765 and 1770 at the user is typing. The autocomplete suggestions may be based on words stored in the wordbase. In this example, the user is typing the query 1760, "show me sales by David." The query processor may be continuously comparing what the user has typed to the words or terms in the wordbase. The word base may include the names of each of the users in the visualization 1720. As the user is typing, the query processor identifies that "David" matches two terms in the wordbase, "David Ciruelos" and "David Cumin." The query processor uses both to generate two autocompletion suggestions 1765 and 1770 that include the two matching terms in the wordbase. The user may select either of the autocompletion suggestions 1765 and 1770 and select enter 1775 initialize processing of the query or enter a new query.

Figure 18:
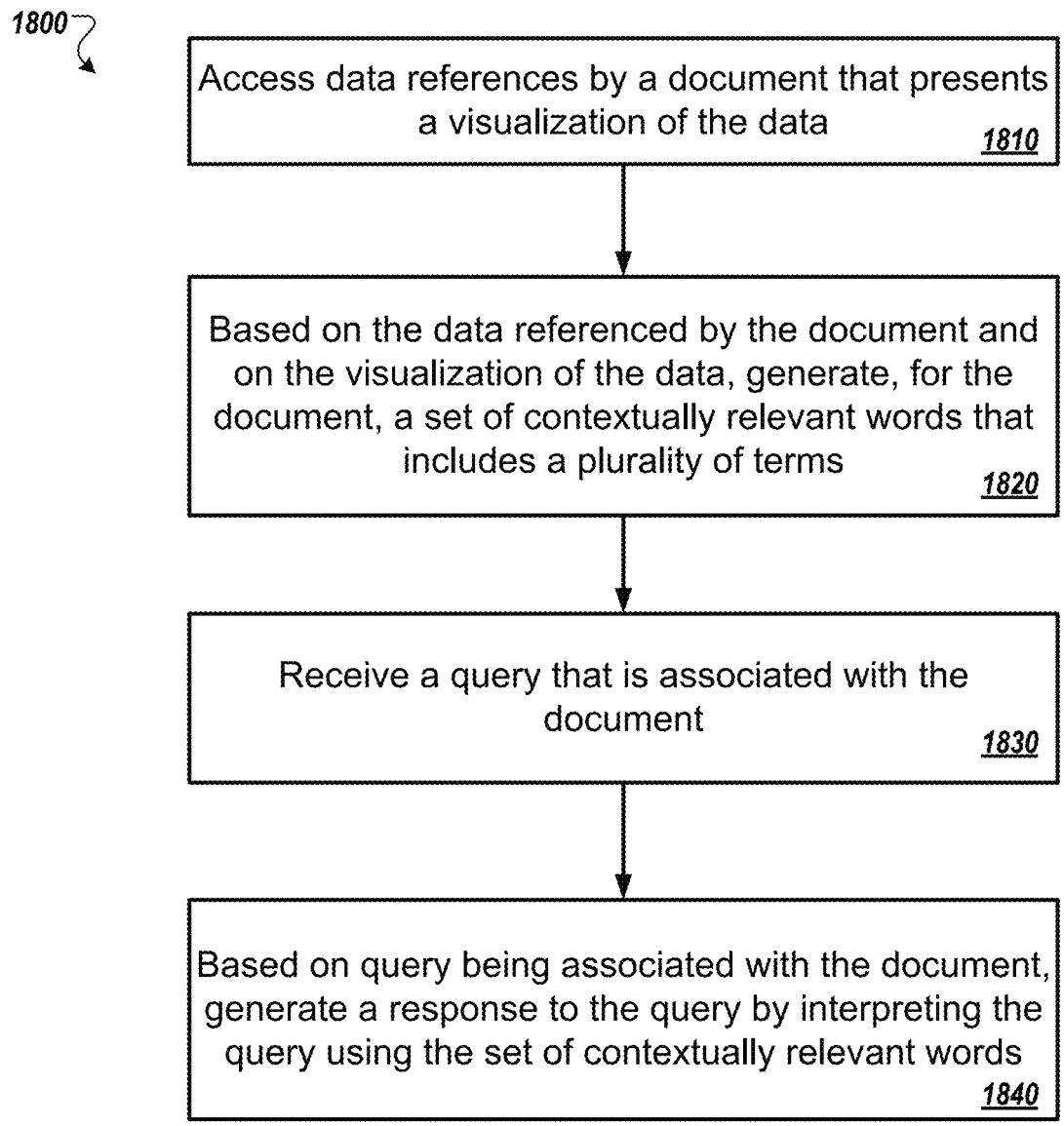
FIG. 18 is an example process that uses a wordbase to process a query.

FIG. 18 is an example process 1800 that uses a wordbase to process a query. In general, the process 1800 generates a set of words or terms that are contextually relevant to a visualization that a user may be viewing and any underlying data that includes the data that the visualization is based on. The process 1800 uses the set of contextually relevant words to interpret queries for the data and the visualization. The process 1800 will be described as being performed by a computer system comprising one or more computers, for example, the system 100 of FIG. 1 and/or the data processing system 1600 of FIGS. 16A-16C.

The system accesses data referenced by a document that presents a visualization of the data (1810). For example, the document may include a visualization of a clothing sales per store for the previous year. The data may include both structured and unstructured data that the system analyzes to generate the visualization. The data may include additional data that is not related to clothing sales per store for the previous year. For example, the data may also include data related to clothing shipments, employee hours and schedules, store sizes, store layouts, store locations, etc. The system is configured to process all this data and generate a visualization that represents a portion of the underlying data.

The system, based on the data referenced by the document and on the visualization of the data, generates, for the document, a set of contextually relevant words that includes a plurality of terms (1820). The set of contextually relevant words may be similar to a wordbase described above. The system may analyze the structured and unstructured data to identify words included in the data. The system may identify words that are field names of databases, row and column names in spreadsheets, titles of text documents, etc. The system may add these words to the set of contextually relevant words. The system may also analyze the visualization being presented to the user. The system may identify words such as labels for x and y axes, legends, titles, etc.

In some implementations, the system may update the set of contextually relevant words when there are changes to the visualization and/or changes to the underlying data. For example, if a new spreadsheet is added to the underlying data, then the system may analyze the spreadsheet for additional words to add to the set of contextually relevant words. If the user updates the visualization, then the system may analyze the visualization to determine if it includes an additional words to add to the set of contextually relevant words.

The system receives a query that is associated with the document (1830). In some implementations, the system may receive the query through a query input field in the document while the document is open.

The system, based on query being associated with the document, generates a response to the query by interpreting the query using the set of contextually relevant words (1840). Based on the results of the query, the system updates the document. In some implementations, the system provides autocomplete suggestions using the set of contextually relevant words. For example, the system may provide the terms that start with "st" after the user types "st." The system may not provide autocomplete suggestions unless there are less than a threshold number of terms that match what the user has types.

In some implementations, each term in the set of contextually relevant words will be associated with one or more objects in the underlying data or in the document. For example, the term "jackets" may be associated with a database and several spreadsheets in the underlying data. If a query includes "jackets," then the system may analyze that database and the spreadsheets.

In some implementations, the system may require that a query include at least one word from the set of contextually relevant words. If a query does not include at least one word from the set of contextually relevant words, then the system may return an error indicating that the system is unable to process the query.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the disclosure.

What is claimed is:

1. A computer-implemented method comprising:
    determining, by one or more computing devices, that a document includes a reference to a dataset, wherein the document includes a visualization generated based on the dataset;
    based on determining that the document includes the reference to the dataset, analyzing, by the one or more computing devices, the dataset referenced by the document to generate, for the document, a set of contextually relevant words that are extracted from the dataset used to generate the visualization included in the document;
    receiving, by the one or more computing devices, a query while at least a portion of the document is presented on a user interface of the one or more computing devices;
    in response to receiving the query while at least the portion of the document is presented on the user interface, determining, by the one or more computing devices, that the query is associated with the document;
    in response to receiving the query, identifying, by the one or more computing devices, a set of results that are responsive to the query;
    after identifying the set of results for the query and based on determining that the query is associated with the document, comparing, by the one or more computing devices, content or metadata of the respective results with the set of contextually relevant words that are extracted from the dataset used to generate the visualization included in the document to identify one or more matches to the set of contextually relevant words;
    ranking, by the one or more computing devices, the set of results based at least in part on the identified one or more matches between the content or metadata of the respective results and the set of contextually relevant words that are extracted from the dataset used to generate the visualization included in the document; and
    generating, by the one or more computing devices, a response to the query that includes a plurality of results from the set of results and indicates the ranking of the plurality of results.

2. The computer-implemented method of claim 1, wherein determining that the query is associated with the document is further based on determining that the query is received through a query input field in the document.

3. The computer-implemented method of claim 1, comprising:
    based on determining that the query is associated with the document, generating, by the one or more computing devices, additional queries using the set of contextually relevant words; and
    generating, by the one or more computing devices, additional responses to the additional queries.

4. The computer-implemented method of claim 1, wherein generating the response to the query comprises:
  generating an autocompleted query of the query; and
  generating the response based on the autocompleted query.

5. The computer-implemented method of claim 1, comprising:
  determining, by the one or more computing devices, that the visualization has been updated; and
  in response to determining that the visualization has been updated, updating, by the one or more computing devices, the set of contextually relevant words based on the updated visualization.

6. The computer-implemented method of claim 1, comprising:
  determining, by the one or more computing devices, that the dataset has been updated; and
  in response to determining that the dataset has been updated, updating, by the one or more computing devices, the set of contextually relevant words based on the updated dataset.

7. The computer-implemented method of claim 1, wherein generating the response to the query comprises: updating the visualization.

8. The computer-implemented method of claim 1, wherein the visualization comprises at least one graph or chart, and wherein generating the set of contextually relevant words comprises adding, to the set of contextually relevant words, words that are included in an axis label, a legend, or a title of the visualization.

9. The computer-implemented method of claim 1, wherein analyzing the dataset referenced by the document or the visualization of the dataset to generate the set of contextually relevant words comprises:
  identifying, in the dataset referenced by the document, words that are included in an object, field, row, column, or table of the dataset; and
  adding, to the set of contextually relevant words, the words that are included in the object, field, row, column, or table of the dataset.

10. The computer-implemented method of claim 1, comprising:
  detecting a change to at least one of the dataset or the visualization of the dataset; and
  updating the set of contextually relevant words based on the detected change to the at least one of the dataset or the visualization.

11. The computer-implemented method of claim 1, wherein receiving, by the one or more computing devices, the query comprises:
  receiving, by the one or more computing devices, the query after generating the set of contextually relevant words that are extracted from the dataset used to generate the visualization.

12. The computer-implemented method of claim 1, wherein analyzing, by the one or more computing devices, the dataset referenced by the document to generate, for the document, the set of contextually relevant words that are extracted from the dataset used to generate the visualization comprises:
  extracting, from the dataset referenced by the document, words for inclusion in the set of contextually relevant words.

13. The computer-implemented method of claim 1, wherein the set of results includes a portion of the dataset that was used to generate the visualization.

14. The computer-implemented method of claim 1, wherein:
  the dataset comprises data stored in a database;
  the visualization comprises at least one graph or chart; and
  determining, by one or more computing devices, that the document includes the reference to the dataset comprises determining, by the one or more computing devices, that the at least one graph or chart was generated from the data stored in the database.

15. A system comprising:
  one or more computing devices; and
  one or more storage devices storing instructions that are operable, when executed by the one or more computing devices, to cause the one or more computing devices to perform operations comprising:
    determining, by the one or more computing devices, that a document includes a reference to a dataset, wherein the document includes a visualization generated based on the dataset;
    based on determining that the document includes the reference to the dataset, analyzing, by the one or more computing devices, the dataset referenced by the document to generate, for the document, a set of contextually relevant words that are extracted from the dataset used to generate the visualization included in the document;
    receiving, by the one or more computing devices, a query while at least a portion of the document is presented on a user interface of the one or more computing devices;
    in response to receiving the query while at least the portion of the document is presented on the user interface, determining, by the one or more computing devices, that the query is associated with the document;
    in response to receiving the query, identifying, by the one or more computing devices, a set of results that are responsive to the query;
    after identifying the set of results for the query and based on determining that the query is associated with the document, comparing, by the one or more computing devices, content or metadata of the respective results with the set of contextually relevant words that are extracted from the dataset used to generate the visualization included in the document to identify one or more matches to the set of contextually relevant words;
    ranking, by the one or more computing devices, the set of results based at least in part on the identified one or more matches between the content or metadata of the respective results and the set of contextually relevant words that are extracted from the dataset used to generate the visualization included in the document; and
    generating, by the one or more computing devices, a response to the query that includes a plurality of results from the set of results and indicates the ranking of the plurality of results.

16. The system of claim 15, the operations comprising:
  receiving the query through a query input field in the document, and
  generating the response to the query based on receiving the query through the query input field in the document.

17. The system of claim 15, wherein the operations comprise:

determining, by the one or more computing devices, that the visualization has been updated; and in response to determining that the visualization has been updated, updating, by the one or more computing devices, the set of contextually relevant words based on the updated visualization.

18. The system of claim 15, wherein the operations comprise:

determining, by the one or more computing devices, that the dataset has been updated; and in response to determining that the dataset has been updated, updating, by the one or more computing devices, the set of contextually relevant words based on the updated dataset.

19. A non-transitory computer-readable medium storing software comprising instructions executable by one or more computing devices which, upon such execution, cause the one or more computing devices to perform operations comprising:

determining, by the one or more computing devices, that a document includes a reference to a dataset, wherein the document includes a visualization generated based on the dataset;

based on determining that the document includes the reference to the dataset, analyzing, by the one or more computing devices, the dataset referenced by the document to generate, for the document, a set of contextually relevant words that are extracted from the dataset used to generate the visualization included in the document;

receiving, by the one or more computing devices, a query while at least a portion of the document is presented on a user interface of the one or more computing devices;

in response to receiving the query while at least the portion of the document is presented on the user interface, determining, by the one or more computing devices, that the query is associated with the document;

in response to receiving the query, identifying, by the one or more computing devices, a set of results that are responsive to the query;

after identifying the set of results for the query and based on determining that the query is associated with the document, comparing, by the one or more computing devices, content or metadata of the respective results with the set of contextually relevant words that are extracted from the dataset used to generate the visualization included in the document to identify one or more matches to the set of contextually relevant words;

ranking, by the one or more computing devices, the set of results based at least in part on the identified one or more matches between the content or metadata of the respective results and the set of contextually relevant words that are extracted from the dataset used to generate the visualization included in the document; and generating, by the one or more computing devices, a response to the query that includes a plurality of results from the set of results and indicates the ranking of the plurality of results.

\* \* \* \* \*